US012666461B2

(12) United States Patent
Wang et al.

(10) Patent No.: US 12,666,461 B2
(45) Date of Patent: Jun. 23, 2026

(54) METHODS, UE AND NETWORK NODE FOR HANDLING A BANDWIDTH PART CONFIGURATION

(71) Applicant: Telefonaktiebolaget LM Ericsson (publ), Stockholm (SE)

(72) Inventors: Min Wang, Luleå (SE); Jan Christoffersson, Luleå (SE); Robert Karlsson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 713 days.

(21) Appl. No.: 17/604,947

(22) PCT Filed: May 12, 2020

(86) PCT No.: PCT/SE2020/050486
§ 371 (c)(1),
(2) Date: Oct. 19, 2021

(87) PCT Pub. No.: WO2020/231316
PCT Pub. Date: Nov. 19, 2020

(65) Prior Publication Data
US 2022/0225407 A1      Jul. 14, 2022

Related U.S. Application Data

(60) Provisional application No. 62/846,775, filed on May 13, 2019.

(51) Int. Cl.
*H04W 74/0808* (2024.01)
*H04L 5/00* (2006.01)
(Continued)

(52) U.S. Cl.
CPC ....... *H04W 74/0808* (2013.01); *H04L 5/0053* (2013.01); *H04W 74/0833* (2013.01); *H04W 74/0836* (2024.01)

(58) Field of Classification Search
CPC .............. H04L 5/0094; H04L 5/0053; H04W 74/0808; H04W 74/0833; H04W 74/0836
See application file for complete search history.

(56) References Cited

U.S. PATENT DOCUMENTS

2019/0150200 A1* 5/2019 Chen ................. H04W 74/0833
                                                  370/329
2019/0182870 A1* 6/2019 Shih .................. H04W 74/0833
(Continued)

OTHER PUBLICATIONS

International Search Report and Written Opinion of the International Searching Authority for PCT International Application No. PCT/SE2020/050486 dated Aug. 13, 2020.
(Continued)

*Primary Examiner* — Oussama Roudani
(74) *Attorney, Agent, or Firm* — Sage Patent Group

(57) ABSTRACT

The present disclosure relates to telecommunications. In one of its aspects, the disclosure concerns a method performed by a User Equipment (UE) in a communications system. The method comprises receiving information indicating a Bandwidth Part (BWP) configuration from a network node. The BWP configuration comprises at least one initial BWP and at least one non-initial BWP. The method further comprises transmitting, to the network node, a Random Access (RA) preamble message according to the received BWP configuration to initiate a RA procedure with the network node.

18 Claims, 14 Drawing Sheets

(51) Int. Cl.
 H04W 74/0833 (2024.01)
 H04W 74/0836 (2024.01)

(56) References Cited

U.S. PATENT DOCUMENTS

| | | | | |
|---|---|---|---|---|
| 2019/0349180 | A1* | 11/2019 | Lu | H04L 27/2607 |
| 2020/0146054 | A1* | 5/2020 | Jeon | H04W 74/006 |
| 2020/0267771 | A1* | 8/2020 | Deogun | H04W 72/0453 |
| 2020/0344732 | A1* | 10/2020 | Li | H04W 74/006 |
| 2021/0007147 | A1* | 1/2021 | Yang | H04W 56/001 |
| 2021/0168862 | A1* | 6/2021 | Murray | H04W 74/002 |
| 2021/0410186 | A1* | 12/2021 | Hajir | H04W 74/006 |
| 2022/0279556 | A1* | 9/2022 | Wu | H04W 72/0453 |
| 2024/0032110 | A1* | 1/2024 | Chang | H04L 5/0092 |
| 2024/0090035 | A1* | 3/2024 | Moon | H04L 27/2607 |

OTHER PUBLICATIONS

MediaTek Inc et al., "On selecting UL BWP for CBRA," R2-1807267, 3GPP TSG-RAN WG2 Meeting #102, Busan Korea May 21-25, 2018, 6 pages.

Samsung, "Further considerations for bandwidth part," R2-1802462, 3GPP TSG-RAN WG2 NR #101 Meeting, Athens Greece Feb. 26-Mar. 2, 2018, 6 pages.

Convida Wireless, "Additional RACH Opportunities for NR-U," R2-1901567, 3GPP TSG-RAN WG2 Meeting #105, Athens Greece Feb. 25-Mar. 1, 2019, 2 pages.

Samsung, "Random Access Resource Selection in NR-U," R2-1900139, 3GPP TSG-RAN2 105, Athens Greece Feb. 25-Mar. 1, 2019, 3 pages.

Qualcomm Incorporated, "Initial access and mobility procedures for NR unlicensed," R1-1905000, 3GPP TSG RAN WG1 Meeting #96bis, Xi'an China Apr. 8-12, 2019, 15 pages.

3GPP TR 38.889 V16.0.0, "3rd Generation Partnership Project; Technical Specification Group Radio Access Network; Study on NR-based access to unlicensed spectrum (Release 16)," Dec. 2018, 119 pages.

3GPP TS 38.211 V15.5.0, "3rd Generation Partnership Project; Technical Specification Group Radio Access Network; NR; Physical channels and modulation (Release 15)," Mar. 2019, 96 pages.

3GPP TS 38.321 V15.5.0, "3rd Generation Partnership Project; Technical Specification Group Radio Access Network; NR; Medium Access Control (MAC) protocol specification (Release 15)," Mar. 2019, 78 pages.

* cited by examiner

100

600

Obtain information indicating BWP configuration
605

Receive BWP configuration
610

Select one LBT subband
620

Initiate a RA procedure according to the obtained BWP configuration
625

Transmit RA preamble
630

700

Determine BWP configuration
710

Provide information indicating BWP configuration
715

Transmit BWP configuration
720

Receive RA preamble
730

BEGIN

*1810*
Base station receives user data from UE

*1820*
Base station initiates transmission of user data to the host computer

*1830*
Host computer receives the user data

END

METHODS, UE AND NETWORK NODE FOR HANDLING A BANDWIDTH PART CONFIGURATION

CROSS REFERENCE TO RELATED APPLICATIONS

This application is a 35 U.S.C. § 371 national stage application of PCT International Application No. PCT/SE2020/050486 filed on May 12, 2020, which claims the benefit of U.S. Provisional Patent Application Ser. No. 62/846,775, filed on May 13, 2019, the disclosures and content of which are incorporated by reference herein in their entireties.

TECHNICAL FIELD

The present disclosure generally relates to telecommunications and embodiments herein relate to a User Equipment (UE), a method performed by the UE, a network node and a method performed by the network node. In particular, the various embodiments described in this disclosure relate to apparatuses and methods for handling bandwidth configurations.

BACKGROUND

Next generation, such as New Radio (NR), systems are expected to support a wide range of use cases with varying requirements ranging from fully mobile devices to stationary Internet of Things (IoT) devices or fixed wireless broadband devices. The traffic pattern associated with many use cases is expected to comprise short or long bursts of data traffic with varying length of waiting period in between, here called inactive state. In NR, both license assisted access and standalone operation in NR-Unlicensed spectrum (NR-U) are to be supported in Third Generation Partnership Project (3GPP). Hence, the procedure of Physical Random Access CHannel (PRACH) transmission and/or Scheduling Request (SR) transmission in unlicensed spectrum shall be investigated in 3GPP.

With network operation in unlicensed spectrum follows a number of restrictions. One of them is that a device, e.g. a radio network node or a UE, has to monitor the shared medium, i.e. the channel, and determine that it is free, i.e. not being used by any other device, before starting to transmit on the channel. This procedure is referred to as Listen-Before-Talk (LBT) or Clear Channel Assessment (CCA). The procedure is also referred to as Listen Before Transmit.

In the following, NR-U and channel access procedure for an unlicensed channel based on LBT is introduced.

NR-U Introduction

In order to tackle the ever-increasing data demand, NR is considered for both licensed and unlicensed spectrum. Compared to Long Term Evolution (LTE) Licensed Assisted Access (LAA), NR-U also needs to support Dual Connectivity (DC) and standalone scenarios, where the Medium Access Control (MAC) procedures comprising Random Access CHannel (RACH) and scheduling procedure on unlicensed spectrum are subject to LBT and thus, potential LBT failures. In LTE LAA, there are no such issues since the RACH and scheduling related signaling may be transmitted on the Primary Cell (PCell) in licensed spectrum instead of unlicensed spectrum.

For Discovery Reference Signal (DRS) transmission such as Primary Synchronization Signal/Secondary Synchronization Signal (PSS/SSS), Physical Broadcast Channel (PBCH), Channel State Information-Reference Signal (CSI-RS), control channel transmission such as Physical Uplink Control Channel/Physical Downlink Control Channel (PUCCH/PDCCH), such as Physical Uplink Shared Channel/Physical Downlink Shared Channel (PUSCH/PDSCH), and uplink Sounding Reference Signal (SRS) such as SRS transmission, channel sensing should be applied to determine the channel availability before the physical signal is transmitted using the channel.

The Radio Resource Management (RRM) procedures in NR-U would be generally rather similar to those in LAA, since NR-U is aiming to reuse LAA/eLAA/feLAA technologies as much as possible to handle the coexistence between NR-U and other legacy Radio Access Technologies (RATs). RRM measurements and report comprising special configuration procedure with respect the channel sensing and channel availability.

Hence, channel access/selection for LAA was one of the important aspects for co-existence with other RATs such as Wi-Fi. For instance, LAA has aimed to use carriers that are congested with Wi-Fi.

Channel Access Procedure in NR-U

Listen-before-talk (LBT) is designed for unlicensed spectrum co-existence with other RATs. In this mechanism, a radio device applies a Clear Channel Assessment (CCA) check, i.e. channel sensing, before any transmission. The transmitter involves Energy Detection (ED) over a time period compared to a certain energy detection threshold, e.g. ED threshold, in order to determine if a channel is idle. In case the channel is determined to be occupied, the transmitter performs a random back-off within a contention window before next CCA attempt. In order to protect the Acknowledgement (ACK) transmissions, the transmitter must defer a period after each busy CCA slot prior to resuming back-off. As soon as the transmitter has grasped access to a channel, the transmitter is only allowed to perform transmission up to a maximum time duration, namely, the Maximum Channel Occupancy Time (MCOT). For Quality of Service (QoS) differentiation, a channel access priority based on the service type has been defined. For example, four LBT priority classes are defined for differentiation of channel access priorities between services using different Contention Window Sizes (CWS) and MCOT durations.

As described in 3GPP TR 38.889 V16.0.0 (December 2018), the channel access schemes for NR-based access for unlicensed spectrum may be classified into at least some of the following categories (cat):

Cat-1: Immediate transmission after a short switching gap

This is used for a transmitter to immediately transmit after an Uplink/Downlink (UL/DL) switching gap inside a COT.

The switching gap from reception to transmission is to accommodate the transceiver turnaround time and is no longer than 16 µs.

Cat-2: LBT without random back-off

The duration of time that the channel is sensed to be idle before the transmitting entity transmits is deterministic.

Cat-3: LBT with random back-off with a contention window of fixed size

The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Cat-4: LBT with random back-off with a contention window of variable size

The LBT procedure has the following as one of its components. The transmitting entity draws a random number N within a contention window. The size of contention window is specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes may be used.

RACH Procedures in NR Unlicensed Spectrum

The ordinary four-step Random Access (RA) has been the current standard for legacy systems such as LTE and NR Rel-15. It has been proposed to study a two-step procedure where the UL messages, e.g. PRACH and/or Msg3, are sent simultaneously and similarly the two DL messages, e.g. time advance command in RAR and contention resolution information, are sent as a simultaneous response in the DL. In the legacy four step procedure, one purpose of the first two messages is to obtain UL time alignment for the UE. In many situations, e.g. in small cells or for stationary UEs, this may not be needed since either a TA=0 will be sufficient (small cells) or a stored TA value from the last RA may serve also for the current RA (stationary UE). TA is short for Timing Advance and is a parameter. TA may be described as a negative offset used by the UE and is the time between the start of a received downlink sub frame and a transmitted uplink sub frame. In future radio networks it may be expected that these situations are common, due to both dense deployments of small cells and a great number of stationary devices, e.g. stationary IoT devices. A possibility to skip the message exchange in cases there is no need to obtain the TA value would lead to reduced RA latency and would be beneficial in several use cases, for example when transmitting infrequent small data packets. On the other hand, the two step RA will consume more resources since it uses contention-based transmission of the data. This means that the resources that are configured for the data transmission may often be unused.

If both the 4-step and 2-step RA are configured in a cell, and for the UE, the UE will choose its preamble from one specific set if it wants to do a 4-step RA, and from another set if it wants to do a 2-step RA. Hence, a preamble partition is done to distinguish between 4-step and 2-step RA. Alternatively, the PRACH configurations are different for the 2-step and 4-step RA procedure, in which case it may be deduced from where the preamble transmission is done if the UE is doing a 2-step or 4-step procedure.

Legacy 4-Step Random Access

The legacy 4-step RA has been used in LTE and is also proposed as baseline for NR. The principle of this procedure is shown in FIG. 1. The network node 101 illustrated in FIG. 1 may be e.g. a eNB, gNB, NB, or any other radio access node or access node or other suitable node.

Step 1: Preamble Transmission

The UE 103 randomly selects a RA preamble, e.g. PRE-AMBLE_INDEX, which is then transmitted by the UE 103 to the network node 101. When the network node 101 detects the preamble, it estimates the TA the UE 103 should use in order to obtain UL synchronization at the network node 101.

Step 2: RA Response (RAR)

The network node 101 sends a RA Response (RAR) comprising the TA, the Temporary Cell-Radio Network Temporary Identifier (TC-RNTI) to be used by the UE 103, a Random Access Preamble identifier that matches the transmitted PREAMBLE_INDEX and a grant for Msg3. The UE 103 expects the RAR and thus, monitors PDCCH addressed to RA-RNTI to receive the RAR message from the network node 101 until the configured RAR window, e.g. a ra-ResponseWindow parameter, has expired or until the RAR has been successfully received.

From 3GPP TS 38.321 V15.5.0 (March 2019): "The MAC entity may stop ra-ResponseWindow (and hence monitoring for Random Access Response(s)) after successful reception of a Random Access Response containing Random Access Preamble identifiers that matches the transmitted PREAM-BLE_INDEX".

Step 3: Msg3—UE ID or UE-Specific C-RNTI

In Message 3 (Msg3) the UE 103 transmits its identifier, e.g. UE ID, for initial access or—if it is already in RRC_CONNECTED or RRC_INACTIVE mode and e.g. needs to resync, its UE-specific RNTI. If the network node 101 may not decode Msg3 at the granted UL resources, it may send Downlink Control Information (DCI) addressed to TC-RNTI for retransmission of Msg3. HARQ retransmission is requested until the UEs 103 restart the random access procedure from step 1 after reaching the maximum number of Hybrid Automatic Repeat reQuest (HARQ) retransmissions or until Msg3 may be successfully received by the network node 101.

Step 4: Msg4—Contention Resolution

In Message 4 (Msg4), the network node 101 responds by acknowledging the UE ID or C-RNTI. The Msg4 gives contention resolution, i.e. only one UE ID or C-RNTI may be sent even if several UEs have used the same preamble, and the same grant for Msg3 transmission, simultaneously.

For Msg4 reception, the UE 103 monitors TC-RNTI, if it transmitted its UE ID in Msg3, or C-RNTI, if it transmitted its C-RNTI in Msg3.

In LTE, the 4-step RA may not be completed in less than 14 ms/TTI/SF. TTI is short for Time Transmission Interval and SF is short for Sub Frame.

2-Step Random Access

The 2-step RA gives much shorter latency than the ordinary 4-step RA. In the 2-step RA, the preamble and a message corresponding to Msg3 in the 4-step RA are transmitted in the same or in two subsequent sub frames. The Msg3 is sent on a resource dedicated to the specific preamble. This means that both the preamble and the Msg3 face contention, but contention resolution in this case means that either both preamble and Msg3 are sent without collision or both collide. The 2-step RA procedure is depicted in FIG. 2. The method exemplified in FIG. 2 comprises at least one of the following steps, which steps may be performed in any suitable order than described below:

Step 201: The UE 103 sends a RA preamble to the network node 101. The network node 101 receives the RA preamble from the UE 103.

Step 202: The UE 103 sends Msg3 to the network node 101. Msg3 may comprise a C-RNTI/ID. The network node 101 receives Msg3 from the UE 103.

Step 201 and 202 may be done in the same sub frame, i.e. the messages in steps 201 and 202 may be sent in the same sub frame.

Step 203: The network node 101 sends a RA response to the UE 103. The RA response may comprise TA. The UE 103 receives the RA response from the network node 101.

Step 204: The network node 101 sends Msg4 to the UE 103. Msg4 may comprise content resolution information. The UE 103 receives Msg4 from the network node 101.

Step 203 and 204 may be done in the same sub frame, i.e. the messages in steps 203 and 204 may be sent in the same sub frame.

Upon successful reception of the preamble and Msg3, the network node 101 may respond with a TA, which by assumption should not be needed or just give very minor updates, and an Msg4 for contention resolution.

An issue that may occur if the UE TA is bad, e.g. using TA=0 in a large cell or using an old TA even though the UE 103 has moved, is that only the preamble may be detected by the network node 101. This may be because a transmission with an inaccurate TA value may interfere with transmissions from other UEs in the same cell. Additionally, the preamble signal has higher detection probability than the normal data due to its design pattern. In this case, the network node 101 may reply with an ordinary RAR giving the UE 103 an opportunity to transmit an ordinary Msg3 on a scheduled resource. This is a fallback to 4-step RA.

Wideband Operation in NR-U

As in NR licensed, it is expected that NR-U may support transmission over a wide bandwidth (>>20 MHz). It is expected that this may be achieved in two different ways: (1) carrier aggregation with configuration of multiple serving cells, e.g., each with 20 MHz bandwidth, and (2) configuration of a single wideband serving cell with bandwidth as an integer multiple of 20 MHz, e.g. 80 MHz.

The following objective is listed in the NR-U WID:

Wide band operation, in integer multiples of 20 MHz, for DL and UL for NR-U supported with multiple serving cells, and wideband operation, in integer multiples of 20 MHz, for DL and UL for NR-U supported with one serving cell with bandwidth >20 MHz with potential scheduling constraints on feasibility of operating the wideband carrier when LBT is unsuccessful in one or more LBT sub bands within the wideband carrier. For all wideband operation cases, CCA is performed in units of 20 MHz, at least for 5 GHz. A LBT sub band may also be referred to as a frequency sub band or subcarrier band.

In both scenarios, CCA is performed in units of 20 MHz, at least for 5 GHz. Two modes according to relationship between the Carrier BandWidth (CBW) and the LBT Band-Width (LBW) may be defined:

Mode 1

Mode 2

In Mode 1, multiple carriers are aggregated, and for each carrier the relationship is that CBW=LBT. For Mode 2, a single wideband carrier is used and the relationship is CBW>LBW. In Wideband Mode 2, the wideband carrier therefore comprises multiple LBT sub bands or multiple LBT bandwidths.

This terminology may be applied generically for both the 5 and 6 GHz bands. For the 5 GHz band, LBW=20 MHz. However, for the 6 GHz band, the LBW is still under discussions. It may be possible that the basic channelization is based on a larger unit than 20 MHz, e.g., 80 MHz, in which case the LBW would be 80 MHz as well.

SUMMARY

It is in view of the above background and other considerations that the various embodiments of the present disclosure have been made.

Band-Width Parts (BWP)

For NR, 3GPP has standardized the use of Band Width Parts (BWPs). The reasons for using BWPs are that some UEs might not be able to use the entire BW, in which case they are assigned a smaller BWP which they are capable of handling. Another reason is for battery savings. A UE may be assigned a more narrow BWP to reduce the needed energy for reception and transmission. Yet another reason may be for load balancing when the UEs does not need the entire BW to meet the bit rate requirements.

According to 3GPP TS 38.211 V15.5.0 (March 2019), section 4.4.5, a carrier bandwidth part is defined as follows: "Carrier Bandwidth Part is a contiguous set of physical resource blocks, selected from a contiguous subset of the common resource blocks for a given numerology(u) on a given carrier."

It has been agreed that each UE is assigned with at least an initial BWP, the same for all UEs, narrow enough for all UEs to handle, and a default BWP. The default BWP may be the same as the initial BWP but may also be different, i.e. different UEs may have different default BWPs. In addition to initial and default BWP, the UE may be configured with additional BWPs. It has been agreed that a UE may have up to four DL/UL BWPs. An important agreement is also that at any point in time, only one BWP is active for a specific UE.

A BWP may also be configured with PRACH occasions, allowing the UE to initiate a Random Access procedure on the BWP. The configuration of PRACH occasions on a BWP is not mandatory except on the initial BWP, where it is always present to allow initial access. Also for PUCCH a BWP may or may not have PUCCH resources configured. The reason for not having a PUCCH configured is that it occupies resources which may lead to overhead, especially in configured but not active BWPs. When a UE 103 initiates a Random Access procedure, it must first ensure that the active BWP contains PRACH occasions and that the DL BWP has the same BWP-ID as the active UL BWP. This is specified in 3GPP TS 38.321 V15.5.0 (March 2019) in Section 5.15.

An example of a possible BWP and PRACH configuration on a wide carrier with 20 MHz LBT-sub bands according to legacy is shown in FIG. 3.

In FIG. 3, three BWPs are shown: an initial BWP 301, a first non-initial BWP 303 and second non-initial BWP 305. The initial BWP 301 has PRACH resources and may be used for initial access. Both the overlapping BWP1 303 and BWP2 305 have PRACH resources in the overlapping sub band. The overlapping may be seen by the overlapping bracket in FIG. 3. This may be used in connected mode if the UE 103 has either BWP1 or BWP2 as active BWP. FIG. 3 also shows the wideband carrier, which comprises the initial BWP 301, the first non-initial BWP 303 and the second non-initial BWP 305. The LBT sub band may of a size of 20 MHz.

With support of multiple LBT sub-bands within a BWP, benefits of providing additional transmission opportunities for an NR-U UE to mitigate the negative impact imposed by LBT operations may be achieved.

One question may be how to provide PRACH configuration across different LBT sub-bands within a BWP. In the NR Rel-15, the time domain locations for PRACH resources are configured by the parameter prach-ConfigurationIndex while the frequency domain locations for RA preambles are configured by the parameter msg1-FrequencyStart and the parameter msg1-FDM. The three parameters are carried by the RRC IE RACH-ConfigGeneric, which is further carried by the IE RACH-ConfigCommon in the IE BWP-Uplink-Common. In this way, the PRACH resources are configured per BWP. So, the existing PRACH configuration framework is not sufficient to support multiple LBT sub-bands.

Therefore, there is a need to at least mitigate or solve these issues.

An objective of embodiments herein is therefore to obviate at least one of the above disadvantages and to improve handling of BWPs. Another objective may be to improve handling of RA procedures.

These general objects have been addressed by the appended independent claims. Advantageous embodiments are defined in the appended dependent claims.

According to a first aspect, there is provided a method performed by a User Equipment (UE) in a communications system.

The method comprises receiving information indicating a Bandwidth Part (BWP) configuration from a network node. The BWP configuration comprises at least one initial BWP and at least one non-initial BWP. The method further comprises transmitting, to the network node, a Random Access (RA) preamble message according to the received BWP configuration to initiate a RA procedure with the network node.

In some embodiments, the BWP configuration comprises a primary initial BWP, at least one secondary initial BWP, and at least one non-initial BWP. The at least one secondary initial BWP may be configured via a supplementary carrier, or in a second cell which belongs to a same or a different cell group as the cell where the RA is triggered, or in the same cell as the primary initial BWP.

In some embodiments, at least one of said at least one initial BWP comprises a plurality of Listen-Before-Talk (LBT) sub bands. The method may then comprise selecting one of the plurality of LBT sub bands; and transmitting the RA preamble to the network node on the selected LBT sub band.

In some embodiments, at least one of said at least one non-initial BWP comprises a plurality of LBT sub bands. RACH occasions (ROs) may be configured across a plurality of said plurality of LBT sub bands. The ROs may belong to a same or different PRACH configuration.

In some embodiments, at least one of the following parameters is defined in the PRACH configuration: a first parameter indicating a sub band offset; a second parameter indicating a number of PRACH transmission occasions in one time instance in one LBT sub band; and a reused at least one existing third parameter associated with LBT sub band. The at least one parameter may be defined for every sub band or for configured specific sub bands.

According to a second aspect, there is provided a method performed by a network node in a communications system.

The method comprises determining a BWP configuration. The BWP configuration comprises at least one initial BWP and at least one non-initial BWP. The method further comprises transmitting information indicating the determined BWP configuration to a UE; and receiving a RA preamble message from the UE according to the determined BWP configuration.

In some embodiments, the BWP configuration comprises a primary initial BWP, at least one secondary initial BWP, and at least one non-initial BWP. The at least one secondary initial BWP may be configured via a supplementary carrier, in a second cell which belongs to a same or a different cell group as the cell where the RA is triggered, or in the same cell as the primary initial BWP.

In some embodiments, at least one of said at least one initial BWP comprises a plurality of LBT sub bands. The method may comprise receiving the RA preamble on a selected LBT sub band of the plurality of LBT sub bands, wherein the selected LBT sub band has been selected by the UE.

In some embodiments, at least one of said at least one non-initial BWP comprises a plurality of LBT sub bands. RO may be configured across a plurality of said plurality of LBT sub bands. The ROs may belong to a same or different PRACH configuration.

In some embodiments, at least one of the following parameters is defined in the PRACH configuration: a first parameter indicating a sub band offset; a second parameter indicating a number of PRACH transmission occasions in one time instance in one LBT sub band; and a reused at least one existing third parameter associated with LBT sub band. The at least one parameter may be defined for every sub band or for configured specific sub bands.

In some embodiments, a separate PRACH configuration is configured in a LBT sub band, wherein the separate PRACH configuration is associated with a LBT sub band index.

According to a third aspect, there is provided a UE adapted to perform the method according to the first aspect.

The UE is adapted to receive information indicating a BWP configuration from a network node. The BWP configuration comprises at least one initial BWP and at least one non-initial BWP. The UE is further adapted to transmit, to the network node, a RA preamble message according to the received BWP configuration to initiate a RA procedure with the network node.

In some embodiments, the BWP configuration comprises a primary initial BWP, at least one secondary initial BWP, and at least one non-initial BWP. The at least one secondary initial BWP may be configured via a supplementary carrier, in a second cell which belongs to a same or a different cell group as the cell where the RA is triggered; or in the same cell as the primary initial BWP.

In some embodiments, at least one of said at least one initial BWP comprises a plurality of LBT sub band. The UE may be adapted to select one of the plurality of LBT sub bands and to transmit the RA preamble to the network node on the selected LBT sub band.

In some embodiments, at least one of said at least one non-initial BWP comprises a plurality of LBT sub bands. ROs may be configured across a plurality of said plurality of LBT sub bands. The ROs may belong to a same or different PRACH configuration.

In some embodiments, at least one of the following parameters is defined in the PRACH configuration: a first parameter indicating a sub band offset; a second parameter indicating the number of PRACH transmission occasions in one time instance in one LBT sub band; and a reused at least one existing third parameter associated with LBT sub band. The at least one parameter may be defined for every sub band or for configured specific sub bands.

In some embodiments, a separate PRACH configuration is configured in a LBT sub band, wherein the separate PRACH configuration is associated with a LBT sub band index.

According to a fourth aspect, there is provided a network node adapted to perform the method according to the second aspect.

The network node is adapted to determine a BWP configuration. The BWP configuration comprises at least one initial BWP and at least one non-initial BWP. The network node is further adapted to transmit information indicating the determined BWP configuration to the UE; and to receive a RA preamble message from the UE according to the determined BWP configuration.

In some embodiments, the configuration for BWP comprises a primary initial BWP, at least one secondary initial BWP, and at least one non-initial BWP. The at least one secondary initial BWP may be configured via a supplementary carrier, in a second cell which belongs to a same or a different cell group as the cell where the RA is triggered, or in the same cell as the primary initial BWP.

In some embodiments, at least one of said at least one initial BWP comprises a plurality of LBT sub bands. The network node may be adapted to receive the RA preamble on a selected LBT sub band of the plurality of LBT sub bands. The selected LBT sub band has been selected by the UE.

In some embodiments, at least one of said at least one non-initial BWP comprises a plurality of LBT sub bands. ROs may be configured across a plurality of said plurality of LBT sub bands. The ROs may belong to a same or different PRACH configuration.

In some embodiments, at least one of the following parameters is defined in the PRACH configuration: a first parameter indicating a sub band offset; a second parameter indicating the number of PRACH transmission occasions in one time instance in one LBT sub band; and a reused at least one existing third parameter associated with LBT sub band. The at least one parameter may be defined for every sub band or for configured specific sub bands.

In some embodiments, a separate PRACH configuration is configured in a LBT sub band.

The separate PRACH configuration is associated with a LBT sub band index.

According to a fifth aspect, there is provided a computer program comprising instructions which, when executed on at least one processor, cause the at least one processor to carry out the method according to the first and/or second aspect.

According to a sixth aspect, there is provided a carrier comprising the computer program of the fifth aspect, wherein the carrier is one of an electronic signal, optical signal, radio signal or computer readable storage medium.

The various proposed embodiments herein provide an improved handling of BWPs and of RA procedures. Embodiments herein afford many advantages, of which a non-exhaustive list of examples are that they enable reduction of random access latency and that unnecessary transmissions are minimized The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to configuration of Physical Random Access CHannel (PRACH) resources across different Listen-Before-Talk (LBT) sub-bands. The embodiments also relate to methods for handling BandWidth configurations comprising at least one initial BandWidth Part (BWP) and at least one non-initial BWP.

Figure 1:
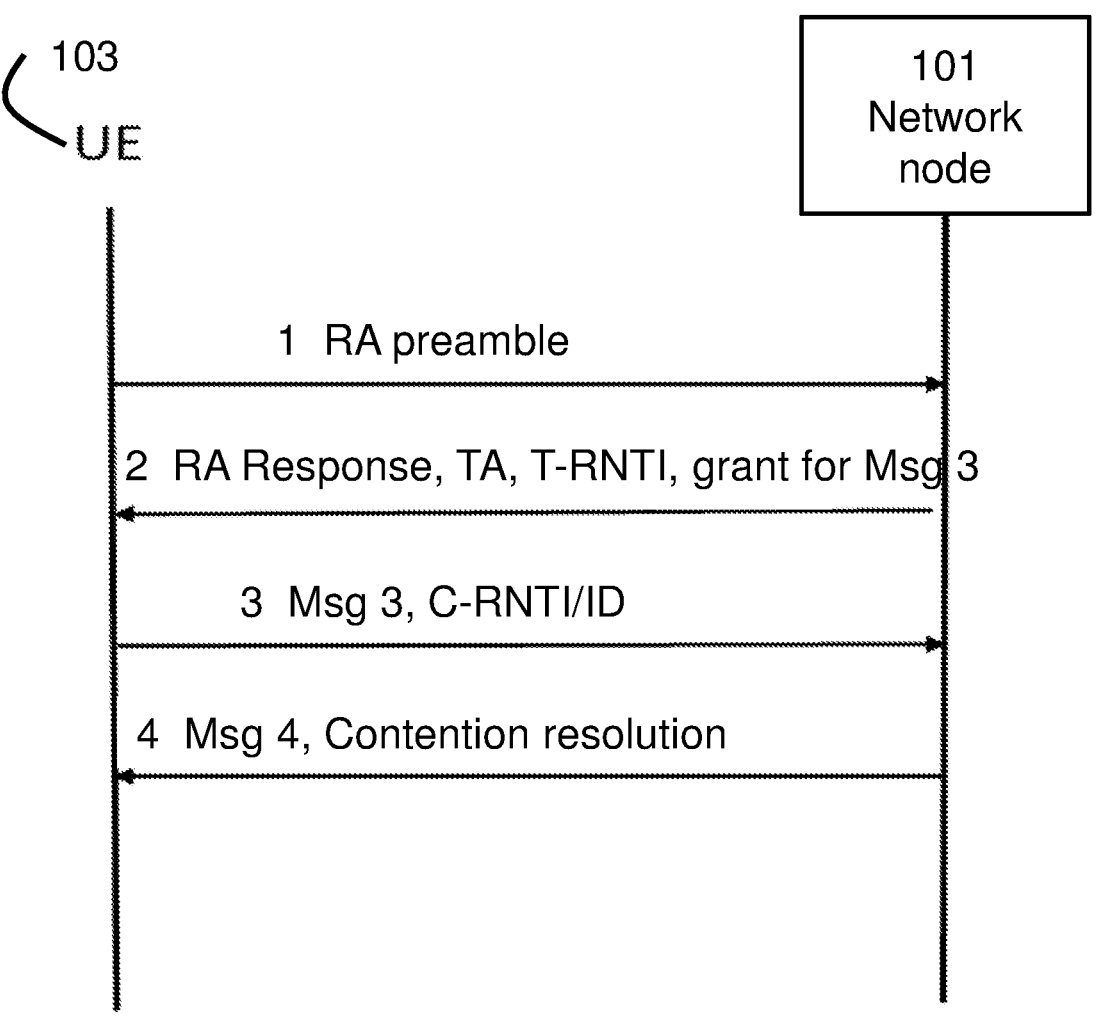
FIG. 1 is a flow chart illustrating an example of a 4-Step RACH procedure.
Figure 2:
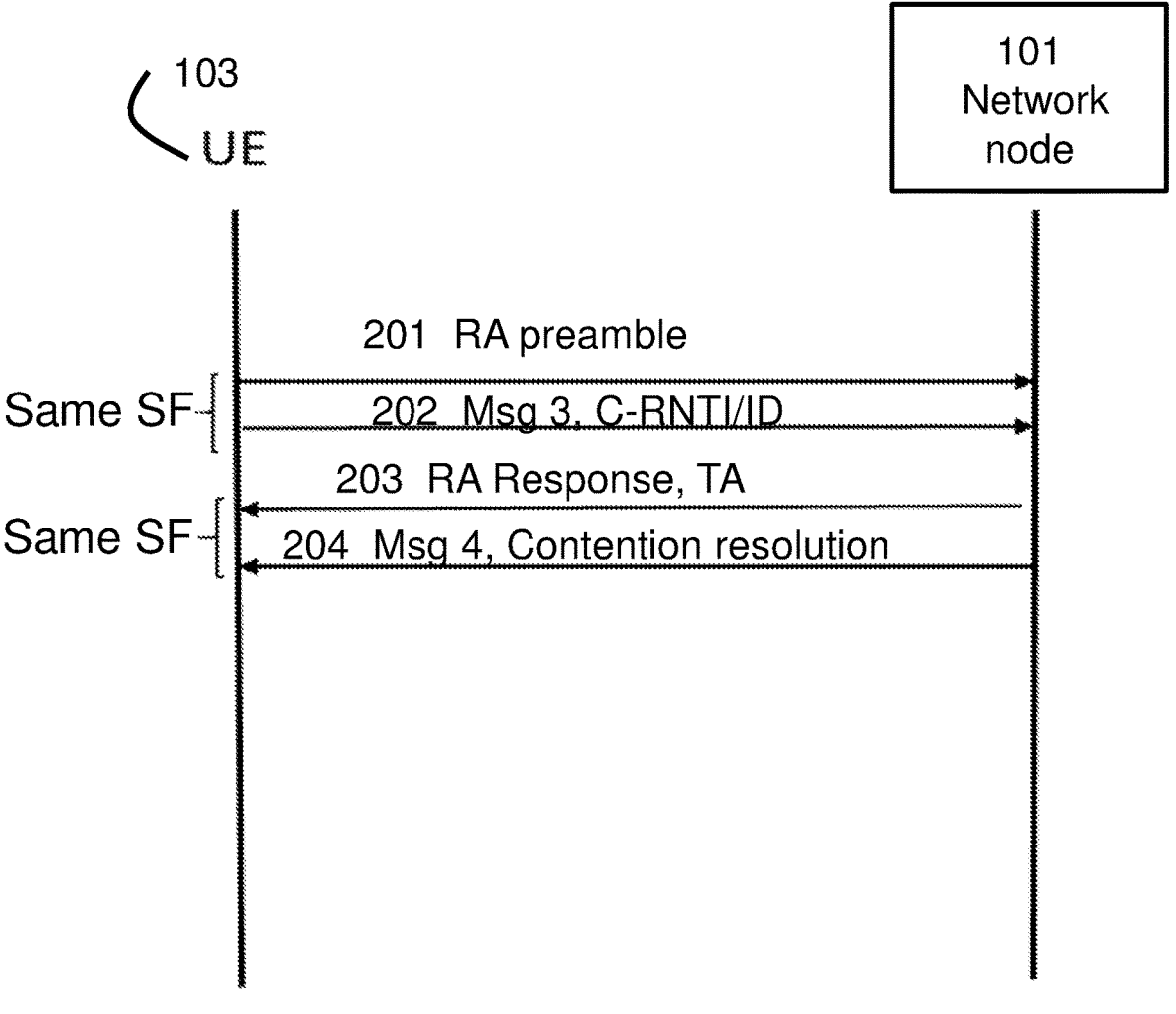
FIG. 2 is a flow chart illustrating an example of a 2-step RA procedure.
Figure 3:
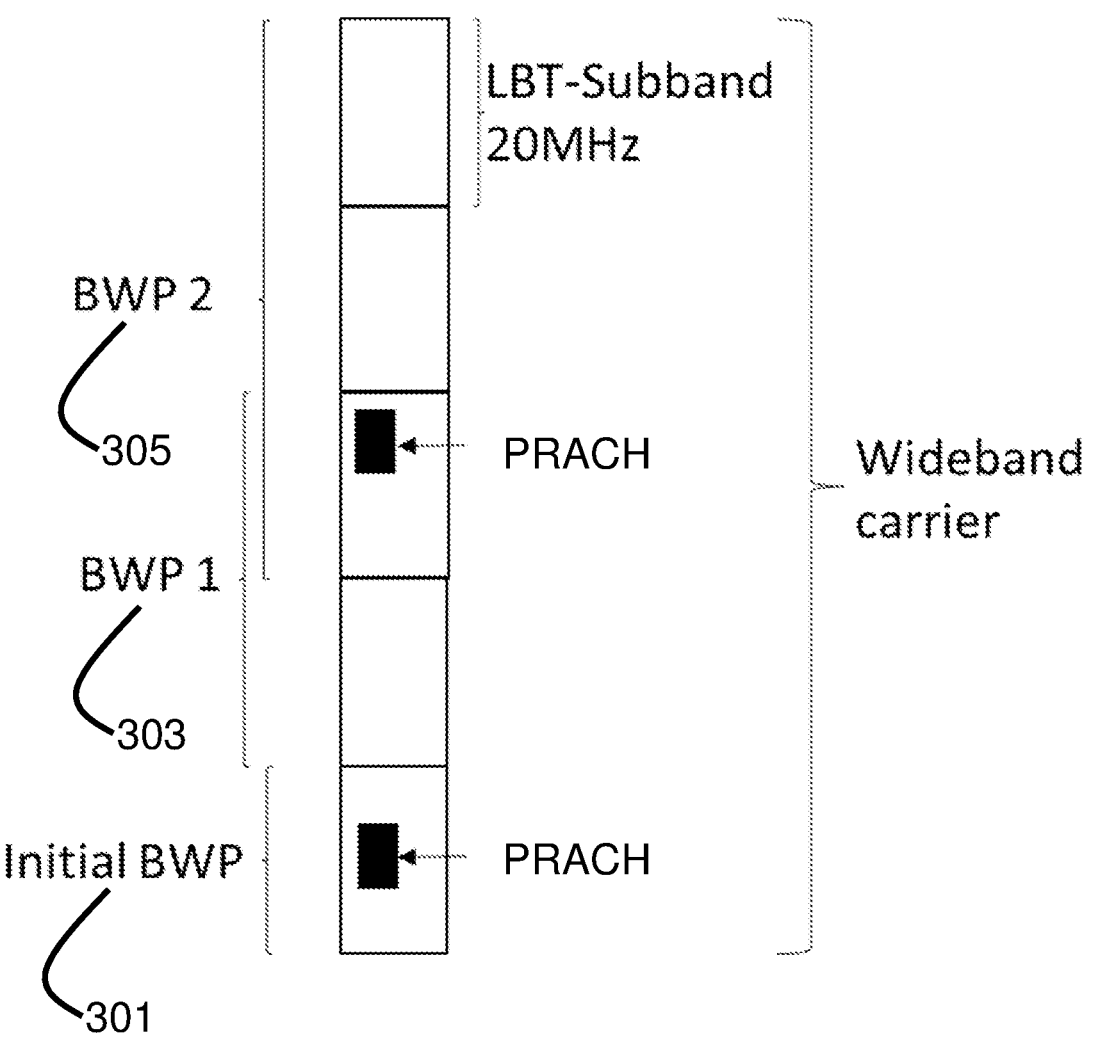
FIG. 3 is an example illustration of a possible BWP and PRACH configuration on a wide carrier with 20 MHz LBT-sub bands according to legacy methods.
Figure 4:
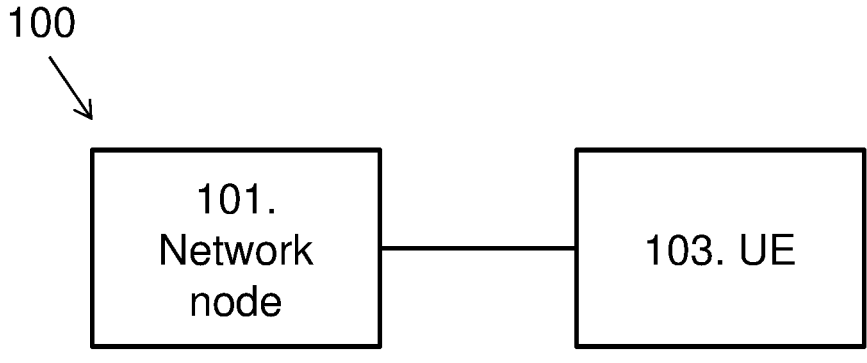
FIG. 4 is a schematic block diagram illustrating an example of a communications system.

FIG. 4 depicts a non-limiting example of a communications system 100, which may be a wireless communications system, sometimes also referred to as a wireless communications network, cellular radio system, or cellular network, in which embodiments herein may be implemented. The communications system 100 may be a Fifth Generation (5G) system, 5G network, NR-U or Next Gen system or network. The communications system 100 may alternatively be a younger system than a 5G system. The communications system 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. The communications system 100 may be a 2G network, a 3G network, a 4G network, a 5G network, a 6G network or any other legacy, current or future network. Thus, although terminology from 5G/NR and LTE may be used in this disclosure to exemplify embodiments herein, this should not be seen as limiting the scope of the embodiments herein to only the aforementioned systems.

The communications system 100 comprises one or a plurality of network nodes, whereof the network node 101 is depicted in the non-limiting example of FIG. 4. The network node 101*a* may be a radio network node, such as a radio base station, or any other network node with similar features capable of serving a UE 103, such as a wireless device or a machine type communication (MTC) device, in the communications system 100. The network node 101 may be an eNB, gNB, MeNB, RNC, NB, etc.

The communications system 100 may cover a geographical area, which may be divided into cell areas, wherein each cell area may be served by a network node, although, one network node may serve one or several cells. Note that any n number of cells may be comprised in the communications system 100, where n is any positive integer. A cell is a geographical area where radio coverage is provided by the network node 101 at a network node site. Each cell is identified by an identity within the local network node area, which is broadcast in the cell. In FIG. 4, network node 101 may serve a cell. The network node 101 may be of different classes, such as, e.g., macro base station (BS), home BS or pico BS, based on transmission power and thereby, also cell size. The network node 101 may be directly connected to one or more core networks, which are not depicted in FIG. 4 for the sake of simplicity. The network node 101 may be a distributed node, such as a virtual node in the cloud, and it may perform its functions entirely on the cloud, or partially, in collaboration with another network node.

One or a plurality of UEs 103 is located in the communication system 100. Only one UE 103 is exemplified in FIG. 4 for the sake of simplicity. A UE 103 may also be referred to simply as a device. The UE 103, e.g. a LTE UE or a 5G/NR UE, may be a wireless communication device, which may also be known as e.g., a wireless device, a mobile terminal, wireless terminal and/or mobile station, a mobile telephone, cellular telephone, or laptop with wireless capability, just to mention some further examples. The UE 103 may be a device by which a subscriber may access services offered by an operator's network and services outside operator's network to which the operator's radio access network and core network provide access, e.g. access to the Internet. The UE 103 may be any device, mobile or stationary, enabled to communicate over a radio channel in the communications network. For example, the UE 103 may be, but is not limited to, a user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance, but not limited to, television, radio, lighting arrangements, tablet computer, laptop or Personal Computer (PC). The UE 103 may be portable, pocket storable, hand held, computer comprised, or vehicle mounted devices, enabled to communicate voice and/or data, via the radio access network, with another entity. The other entity may be an entity such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system.

The UE 103 is enabled to communicate wirelessly within the communications system 100. The communication may be performed e.g. between two devices, between a devices and a regular telephone, between the UE 103 and a network node, between network nodes, and/or between the devices and a server via the radio access network and possibly one or more core networks and possibly the internet.

The network node 101 may be configured to communicate in the communications system 100 with the UE 103 over a communication link, e.g., a radio link.

It should be noted that the communication links in the communications network may be of any suitable kind comprising either a wired or wireless link. The link may use any suitable protocol depending on type and level of layer (e.g. as indicated by the OSI model) as understood by the person skilled in the art.

When the text herein describes the network node 101 performs an action or method step, this may also be described as the network performs a certain action or method steps. In other words, the network may be represented by a network node 101 performing the action or method step described herein.

Figure 5:
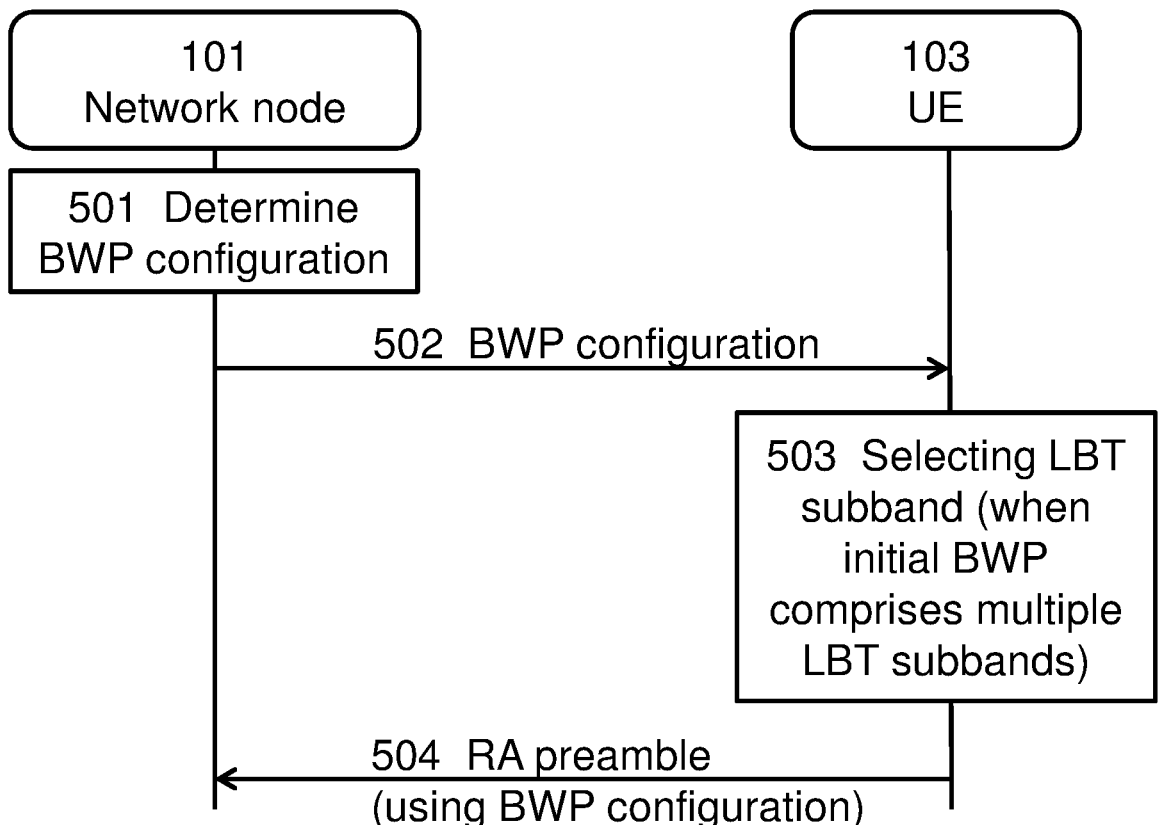
FIG. 5 is a signaling diagram illustrating an example of a method.

According to a first aspect of the present disclosure, there is provided a method performed by a UE 103 in a communications system 100. According to a second aspect of the present disclosure, there is provided a method performed by a network node 101 in a communications system 100. These methods are first going to be described with reference to FIG. 5. FIG. 5 is a signaling diagram illustrating an example of the methods. The methods comprise at least one of the following steps, which steps may be performed in any suitable order than described below:

Step 501

The network node 101 determines a BWP configuration. This may also be described as the network node 101 configures PRACH across different LBT sub-bands.

Step 502

The network node 101 provides information indicating the BWP configuration to the UE 103. The information may be provided by transmitting it directly to the UE 103, or by transmitting it via some other node to the UE 103, e.g. via another network node, memory unit etc. The information may be the actual BWP configuration or it may be an address to a node form which the UE 103 may obtain the BWP configuration. The UE 103 obtains the information indicating the PWP configuration from the network node 101, Step 503

The UE 103 may select a LBT sub band from multiple LBT sub bands. This step may be performed when the initial BWP comprises multiple LBT sub bands.

Step 504

The UE 103 provides a RA preamble message to the network node 101. This may also be described as the UE 103 initiating a RA procedure. The RA preamble message may be provided to the network node 101 using the determined BWP configuration, i.e. the BWP configuration determined in step 501. The network node 101 obtains the RA preamble message from the UE 103. This may also be described as the network node 101 detects that the UE 103 has initiated a RA procedure.

Figures 6, 7:
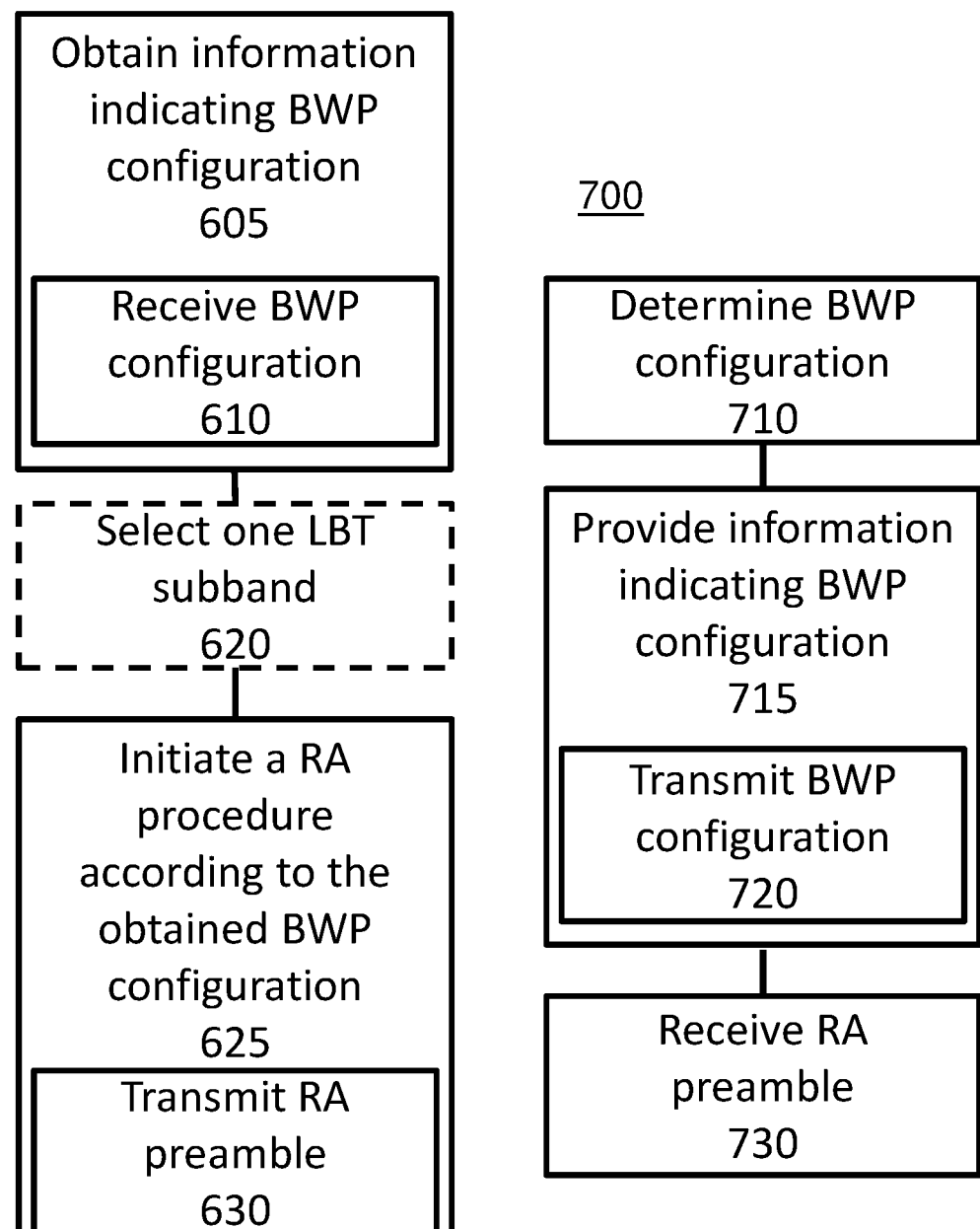
FIG. 6 is a flow chart according to embodiments herein.
FIG. 7 is a flow chart according to embodiments herein.

The method described above will now be described seen from the perspective of the UE 103 with reference to FIG. 6. The method 600 performed by a UE 103 in a communications system 100 comprises at least one of the following described steps, which steps may be performed in any suitable order than described below. The method 600 may start with step 605 of obtaining information indicating a BWP configuration from the network node 101. Step 605 in FIG. 6 corresponds to step 502 in FIG. 5. The obtaining of information comprises step 610 of receiving information indicating a BWP configuration from a network node 101. The information may be received directly from the network node 101 or via some other node or memory unit. The BWP configuration comprises at least one initial BWPs and at least one non-initial BWPs. The method 600 may further comprise step 625 of initiating a RA procedure according to the obtained BWP configuration. Step 625 in FIG. 6 corresponds to step 504 in FIG. 5. The initiating of the RA procedure comprises step 630 of transmitting, to the network node 101, a RA preamble message according to the received BWP configuration to initiate a RA procedure with the network node 101.

In some embodiments, the BWP configuration may comprise a primary initial BWP, at least one secondary initial BWP, and at least one non-initial BWP. In other embodiments, the BWP configuration may comprise a primary initial BWP, a first non-initial BWP, and a second non-initial BWP.

In embodiments when the BWP configuration comprises at least one secondary initial BWP, the at least one secondary initial BWP may be configured, by the network node 101, via a supplementary carrier, or in a second cell which belongs to a same cell group or a different cell group as the cell where the RA is triggered, or in the same cell as the primary initial BWP. Thus, the at least one secondary initial BWP may be configured, by the network node 101, via a supplementary carrier. Alternatively, the at least one secondary initial BWP may be configured in a second cell which belongs to a same cell group or a different cell group as the cell where the RA is triggered. Alternatively, the at least one secondary initial BWP may be configured in the same cell as the primary initial BWP.

In some embodiments, the initial BWP, e.g. the primary initial BWP, may comprise a Listen-Before-Talk (LBT) sub band. In some embodiments, at least one of said at least one initial BWP, e.g. the primary initial BWP, may comprise a plurality of LBT sub bands. For example, the primary initial BWP may comprise a first LBT sub band and a second LBT sub band. In these embodiments, the method 600 performed by the UE 103 may further comprise step 620 of selecting one of the plurality of LBT sub bands. Step 620 in FIG. 6 corresponds to step 503 in FIG. 5. If the primary initial BWP comprises a first and a second LBT sub bands, the UE may select the first LBT sub band or the second LBT sub band. Then, the step 630 of transmitting the RA preamble to the network node 101 comprises transmitting the RA preamble to the network node 101 on the selected LBT sub band, i.e. the selected first LBT sub band or second LBT sub band. The selected first LBT sub band or second LBT sub band may be the LBT sub band that wins the LBT.

In some embodiments, the at least one of said at least one non-initial BWP, e.g. the first non-initial BWP and/or the second non-initial BWP, may comprise a plurality of LBT sub bands. When the non-initial BWP comprises multiple LBT sub bands, RACH occasions, ROs, may be configured across a plurality of said plurality of LBT sub bands. The ROs may belong to a same or different PRACH configuration.

According to some embodiments, at least one of the following parameters may be defined in the PRACH configuration, e.g. according to RRC IE RACH-ConfigGeneric or RRC RACH-ConfigGeneric, a first parameter, a second parameter or a reused at least one third existing parameter associated with LBT sub band. The first parameter indicating a sub band offset and may be referred to as e.g. msg1-FrequencyStart-sub band. The second parameter indicating the number of PRACH transmission occasions in one time instance in one LBT sub band and may be referred to as e.g. msg1-FDM-sub band. RRC RACH-ConfigGeneric or RRC IE RACH-ConfigGeneric may be described as an information element or parameter, i.e. a generic RACH parameter. It may be used to specify the cell specific RA parameters both for regular RA as well as for beam failure recovery. The at least one parameter, e.g. the msg1-FDM-sub band parameter and/or an msg1-FrequencyStart-sub band parameter, may be defined for every sub band or for configured specific sub bands.

In some embodiments, a separate PRACH configuration corresponding to e.g., RRC IE RACH-ConfigCommon may be configured in a LBT sub band. The separate PRACH configuration may be associated with a LBT sub band index. RRC IE RACH-ConfigCommon may also be referred to as RRC RACH-ConfigCommon. RRC IE RACH-ConfigCommon may be described as a parameter or information element. The RACH-ConfigCommon IE is used to specify the cell specific random-access parameters. According to another aspect, the present disclosure provides a first computer program, which may comprise instructions which, when executed on at least one processor, cause the at least one processor to carry out the method according to any one of embodiments described herein, e.g. the method 600 performed by the UE 103. A first carrier may comprise the first computer program, and the first carrier may be one of an electronic signal, optical signal, radio signal or computer readable storage medium.

The method in the signalling diagram described above will now be described with reference to FIG. 7, seen from the perspective of the network node 101. The method 700 performed by a network node 101 in a communications system 100 comprises at least one of the following described steps, which steps may be performed in any suitable order than described below. The method 700 starts with step 710 of determining a BWP configuration. Step 710 in FIG. 7 corresponds to step 501 in FIG. 5. The BWP configuration comprises at least one initial BWP and at least one non-initial BWPs. The method 700 continues with step 715 of providing information indicating the determined BWP configuration to the UE 103. Step 715 in FIG. 7 corresponds to step 502 in FIG. 5. The step 715 of providing information indicating the determined BWP configuration to the UE 103 comprises step 720 of transmitting information indicating the determined BWP configuration to the UE 103. The information may be transmitted directly or via some other node or memory unit. The method 700 further comprises step 730 of receiving a RA preamble message from the UE 103 according to the determined BWP configuration. Step 730 in FIG. 7 corresponds to step 504 in FIG. 5.

In some embodiments, the BWP configuration may comprise a primary initial BWP, at least one secondary initial BWP, and at least one non-initial BWP. In other embodiments, the BWP configuration may comprise a primary initial BWP, a first non-initial BWP, and a second non-initial BWP.

In embodiments when the BWP configuration comprises at least one secondary initial BWP, the at least one secondary initial BWPs may be configured via a supplementary carrier; or in a second cell which belongs to a same cell group or a different cell group as the cell where the RA is triggered; or in the same cell as the primary initial BWP.

In some embodiments, the initial BWP, e.g. the primary initial BWP, may comprise a LBT sub band. In some embodiments, the initial BWP, e.g. the primary initial BWP, may comprise a plurality of LBT sub bands, e.g. a first LBT sub band and a second LBT sub band. In these embodiments, the method 700 performed by the network node 101 may further comprise step 730 of receiving the RA preamble on a selected LBT sub band of the plurality of LBT sub bands, wherein the LBT sub band has been selected by the UE 103. If the initial BWP comprises a first LBT sub band and a second LBT sub band, the RA preamble may be received on the selected first or second LBT sub band, which has been selected by the UE 103. For example, the selected LBT sub band, e.g. first LBT sub band or second LBT sub band, may be the LBT sub band that wins the LBT. The LBT sub band that wins the LBT may be the LBT sub band that fulfills a LBT criterion.

In some embodiments, at least one of said at least one non-initial BWP may comprise a plurality of LBT sub bands. For example, the first non-initial BWP and/or the second non-initial BWP may comprise at least one LBT sub band. In these embodiments, when the non-initial BWP comprises a plurality of LBT sub bands, ROs may be configured across a plurality of said plurality LBT sub bands. The ROs may belong to a same or different PRACH configuration.

In some embodiments, at least one of the following parameters may be defined in the PRACH configuration, e.g. according to RRC IE RACH-ConfigGeneric, a first parameter indicating a sub band offset, a second parameter indicating the number of PRACH transmission occasions in one time instance in one LBT sub band, and a reused at least one existing third parameter associated with LBT sub band. The first parameter may be referred to as e.g. msg1-FrequencyStart-sub band. The second parameter may be referred to as e.g. msg1-FDM-sub band.

The at least one parameter, e.g. the msg1-FDM-sub band parameter and/or an msg1-FrequencyStart-sub band parameter, may be defined for every sub band or for configured specific sub bands.

In some embodiments, a separate PRACH configuration corresponding to e.g., RRC IE RACH-Config Common, may be configured in a LBT sub band. The separate PRACH configuration may be associated with a LBT sub band index.

The network node 101 may be an NB, eNB, gNB, RNC, access node, RAN node, core network, CN, node, etc., or any other suitable network node.

According to another aspect, the present disclosure provides a second computer program, which may comprise instructions which, when executed on at least one processor, cause the at least one processor to carry out the method according to any one of embodiments described herein, e.g. the method performed by the network node 101. A second carrier may comprise the second computer program, and the second carrier may be one of an electronic signal, optical signal, radio signal or computer readable storage medium.

The below embodiments are described in the context of NR unlicensed spectrum (NR-U). The embodiments herein are not limited to NR-U scenarios. They are also applicable to other unlicensed operation scenarios such as LTE LAA/eLAA/feLAA/MulteFire.

Figure 8:
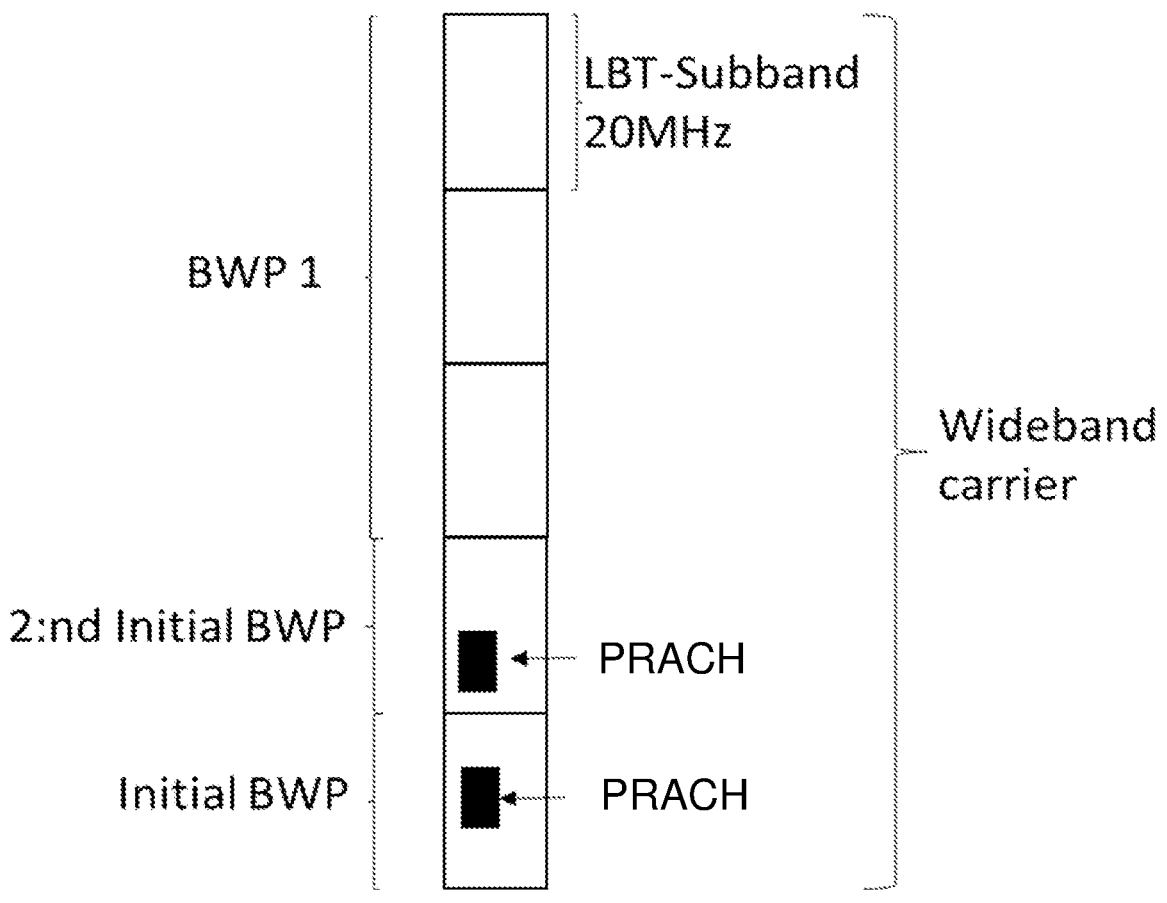
FIG. 8 is an example illustration of two initial BWPs.

In one embodiment, at least one secondary initial BWP may be defined for the UE 103 to improve transmission opportunities for Random accesses triggered for initial access. In this embodiment, the bandwidth for each initial BWP is restricted to the bandwidth of a LBT sub band, e.g., 20 MHz. Hence, it comprises one LBT sub-band. In this case, the UE 103 is configured with a primary initial BWP, plus at least one secondary BWP. Given a UE 103 configured with up to 4 BWPs, therefore, occupying BWI IDs in the range between 0 and 3. The secondary initial BWPs would then occupy BWP IDs in the range beyond 4. All initial BWPs are configured using RMSI. This is illustrated in FIG. 8. In FIG. 8, the UE 103 may do initial access on either of the two initial BWPs, if the LBT succeeds on that sub band. FIG. 8 shows the wideband carrier as comprising the primary initial BWP, the secondary initial BWP and the first non-initial BWP. A LBT sub band may be of 20 MHz.

In one example embodiment, a secondary initial BWP may be configured via a supplementary carrier. For providing more FDMed RACH resources, a UE 103 may be configured at least one supplementary uplink (SUL) carriers in UL, and/or one or multiple SUL carriers in DL.

In another example embodiment, a secondary initial BWP may be configured in a second cell, which belong a same or a different cell group with the cell where the RA is triggered. The cell group may share the same timing advance or the same PUCCH resources, or the same set of PRACH resources.

In yet another example embodiment, a secondary initial BWP may be configured in the same cell as the primary initial BWP. In this case, the cell may therefore configure more than 4 BWPs for a UE 103.

For a RA triggered for initial access, the UE 103 may perform multiple LBT operations in parallel, and each of them on a different initial BWP, either on a primary or on a secondary initial BWP, the UE 103 then selects just one of initial BWP, which has succeeded LBT operation, to transmit PRACH preamble. For simplicity, the UE 103 may choose to stay on the same initial BWP to complete the RA procedure.

The network node 101 may need to monitor all configured initial BWPs, since the network node 101 is not aware in which initial BWP a UE 103 may initiate a RA procedure.

Figure 9:
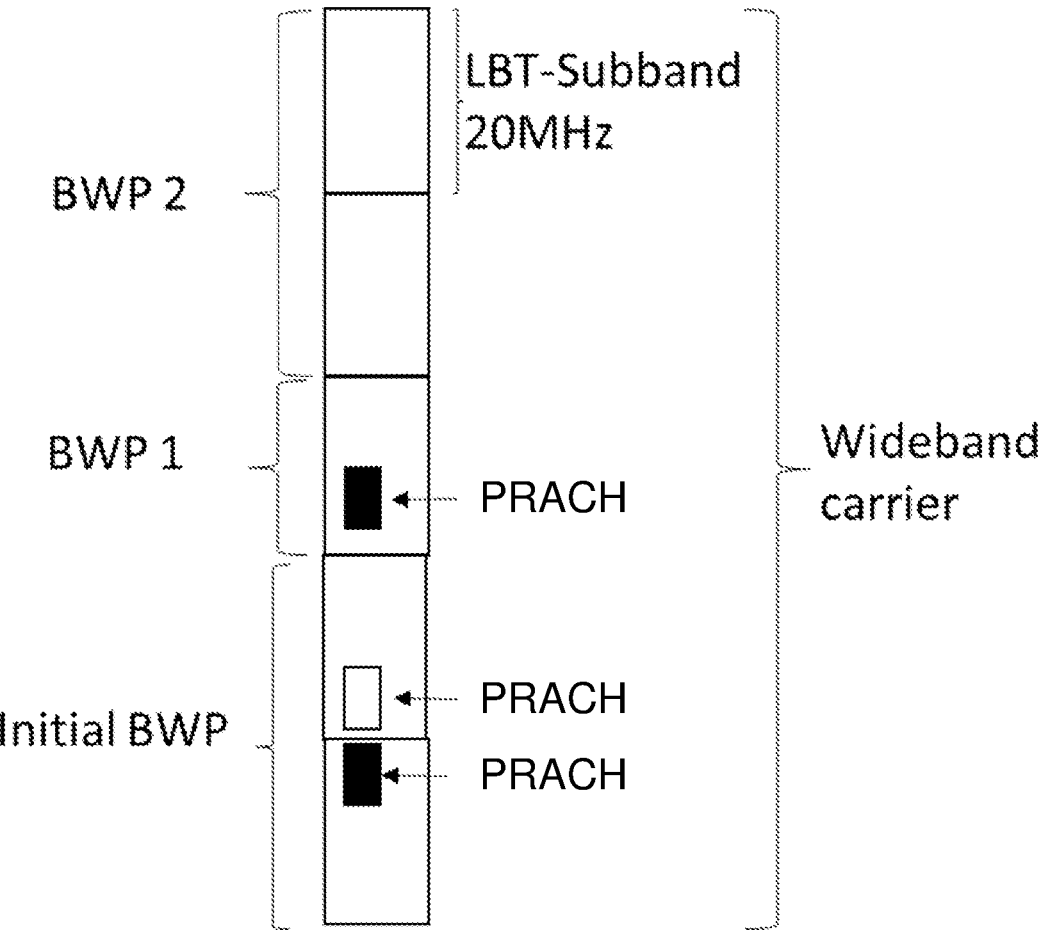
FIG. 9 is an example illustration of PRACH overlapping two sub-bands in the same initial BWP.

In another embodiment, the initial BWP may comprise more than one LBT sub-bands, i.e., its bandwidth is not restricted to one LBT sub band. In this case, RACH occasions (ROs) may be configured across LBT sub-bands. These ROs belong to the same or different PRACH configurations. This is illustrated in FIG. 9, where two RACH occasions are configured in the initial BWP and the first belongs to first LBT sub band and the second to the second LBT sub band. FIG. 9 shows the wideband carrier comprising a primary initial BWP, a first non-initial BWP and a second non-initial BWP. The LBW sub band may be 20 MHz.

For a RA triggered for initial access, the UE 103 may perform multiple LBT operations in parallel, and each of them on a different LBT sub band within the initial BWP, the UE 103 then selects just one of LBT sub-bands which has succeeded LBT operation, to transmit PRACH preamble. For simplicity, the UE 103 may choose to stay on the same LBT sub band to complete the RA procedure.

The network node 101 may need to monitor all LBT sub-bands within the initial BWP, since the network node 101 is not aware in which LBT sub band a UE 103 may initiate a RA procedure.

In an embodiment where a non-initial BWP comprises multiple LBT sub-bands, then RACH occasions (ROs) may be configured across LBT sub bands. These ROs belong to the same or different PRACH configurations.

In another embodiment, in order to configure ROs belonging to a same PRACH configuration across sub-bands in the associated BWP, besides the 3GPP parameters msg1-FrequencyStart and msg1-FDM, one or multiple additional parameters may be defined in the RRC IE RACH-Config-Generic. These parameters may be new parameters or existing parameters, which are reused. However, the embodiments herein are not limited by these examples, in other examples, different names of parameters may be used.

As an example, an additional parameter named as msg1-FDM-sub band may be introduced, which defines the number of PRACH transmission occasions FDMed in one time instance in one LBT sub band. Meanwhile, the existing parameter msg1-FrequencyStart may be redefined to indicate an Offset of lowest PRACH transmission occasion in frequency domain with respective to the first PRB within a LBT sub band. The value may be configured so that the corresponding RACH resource is entirely within the bandwidth of the UL LBT sub band. In this example, the total number of all PRACH ROs in frequency domain in all concerned LBT sub band in a BWP may equal to msg1-FDM.

As an example, an additional parameter named as msg1-FDM-sub band may be introduced, which defines the number of PRACH transmission occasions FDMed in one time instance in one LBT sub band. Meanwhile, another new parameter msg1-FrequencyStart-sub band is also introduced to indicate Offset of lowest PRACH transmission occasion in frequency domain with respective to the first PRB within a LBT sub band. The value may be configured so that the corresponding RACH resource is entirely within the bandwidth of the UL LBT sub band.

Figure 10:
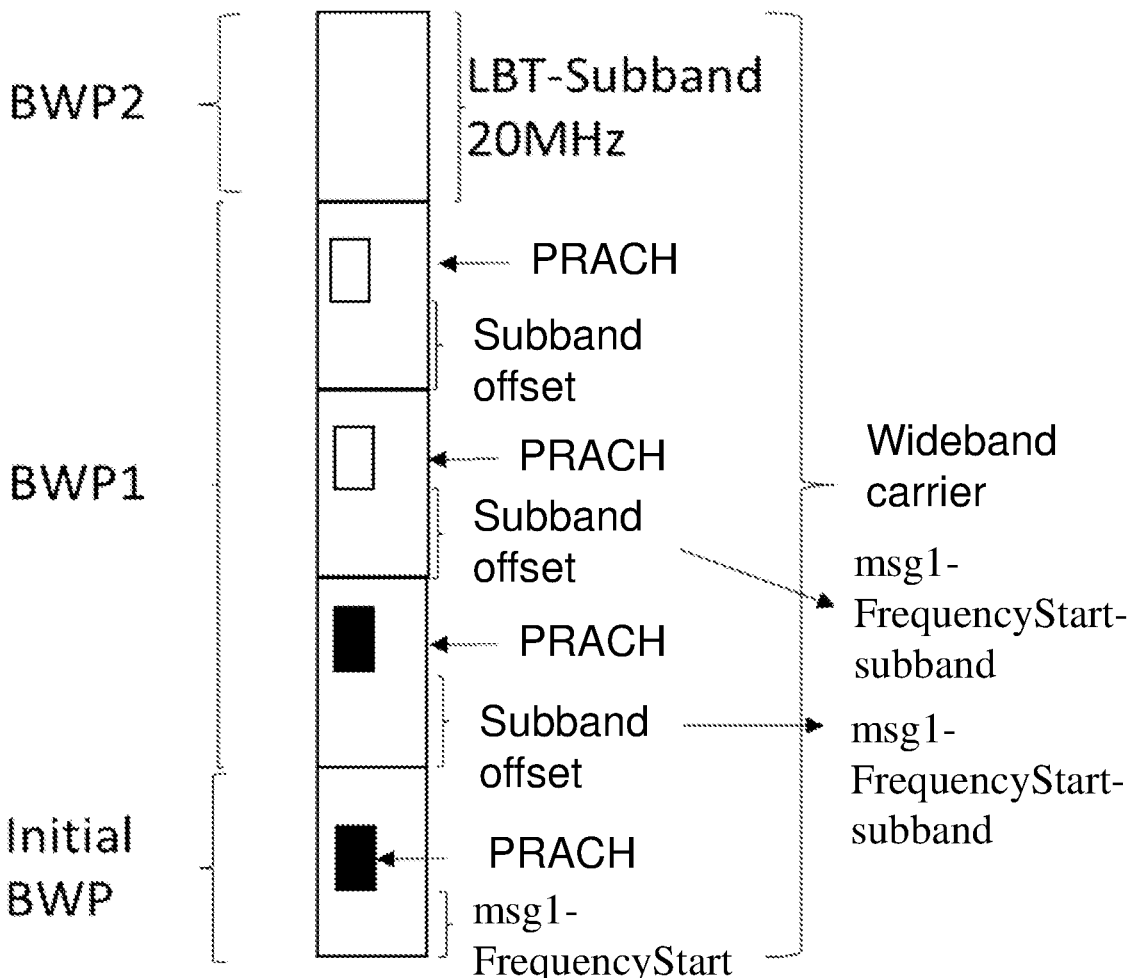
FIG. 10 is an example illustration of use of new msg1-FDM-sub band parameter and re-interpretation of msg1-FrequencyStart, sub band offset in FIG. 8.

These two parameters may be defined for every sub band, or for configured specific sub-bands. In principle, a different LBT sub band may be configured with different settings of these two parameters. Therefore, in a single PRACH configuration, a list of settings may be comprised and each of them may be applicable to a different LBT sub band. This is illustrated in FIG. 10. FIG. 10 illustrates use of a new msg1-FDM-sub band parameter and re-interpretation of msg1-FrequencyStart, indicated as Sub band offset in FIG. 10. FIG. 10 shows a wideband carrier comprising a primary initial BWP, a first non-initial BWP and a second non-initial BWP. The LBT sub band may be for example 20 MHz. The primary initial BWP is associated with a PRACH and msg1-FrequencyStart. The first non-initial BWP is associated with a PRACH and a sub band offset, e.g. msg1-FrequencyStart-subband parameter, in a first sub band, a PRACH and a sub band offset, e.g. msg1-FrequencyStart-subband in a second sub band, a PRACH and a sub band offset in a third sub band. The second non-initial BWP is not associated with PRACH.

As an example, there is no new parameter defined, by setting a proper value for the parameter msg1-FrequencyStart so that PRACH transmission occasions in frequency domain in one time instance to cross at least one LBT sub band boundary. In this case, configured RO in the second LBT sub band may start from the first PRB in the second LBT sub band. As another option, configured RO in the second LBT sub band may start from a PRB with an offset with respective to the first PRB in the second LBT sub band. In this case, an additional new parameter to define the offset need to be configured accordingly. There may be one or multiple PRBs at the boundary of the first LBT sub band are not used for ROs, since they may not be sufficient to fill one PRACH RO.

In a further embodiment, a separate PRACH configuration corresponding to RRC IE RACH-ConfigCommon, is configured in a LBT sub band. In this case, this PRACH configuration is associated with a LBT sub band index. In RRC IE BWP-Uplink or BWP-Downlink, a list of LBT sub band indices need to be comprised. In this way, a BWP may be configured via RRC to comprise multiple LBT sub bands.

Note that although the methods herein are described in the context of NR, the same methods may be applied to any access technologies that make use of SI like LTE or Narrowband-Internet of Things (NB-IoT).

Figure 11A:
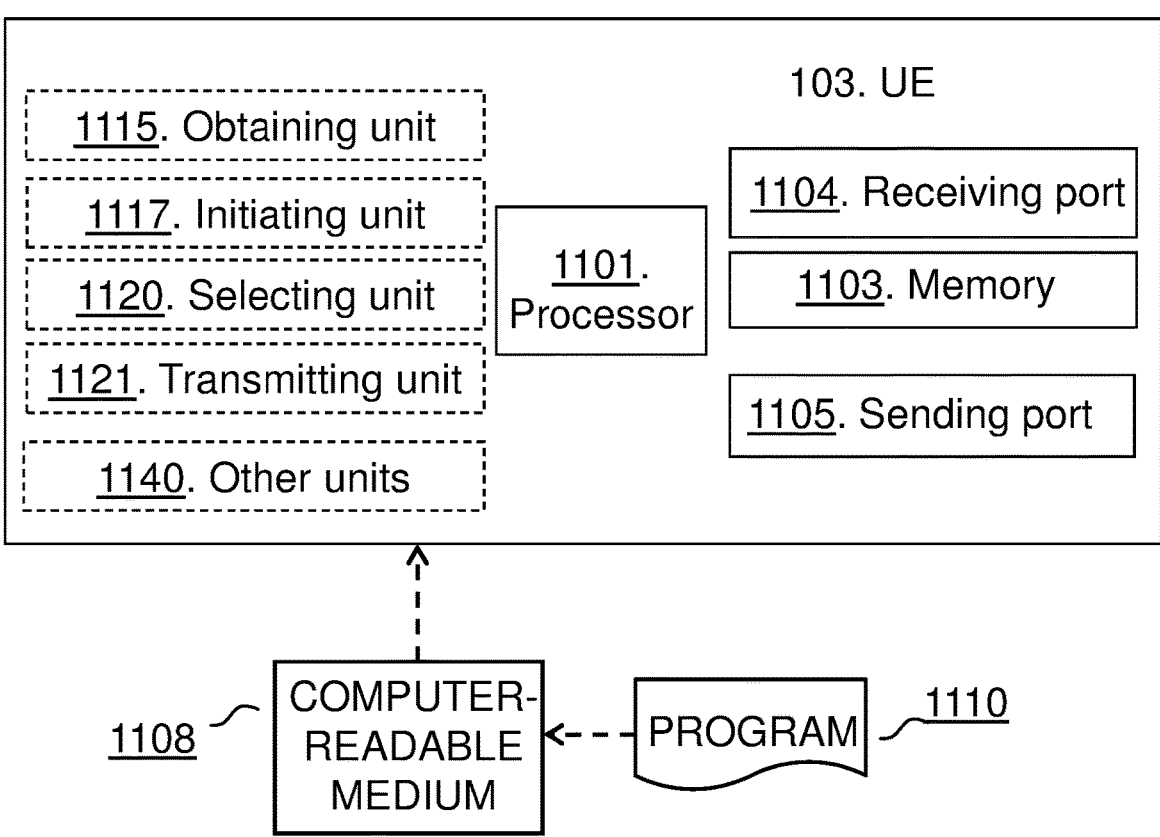
FIG. 11a-11b are schematic drawings illustrating an example of a UE.
Figure 11B:
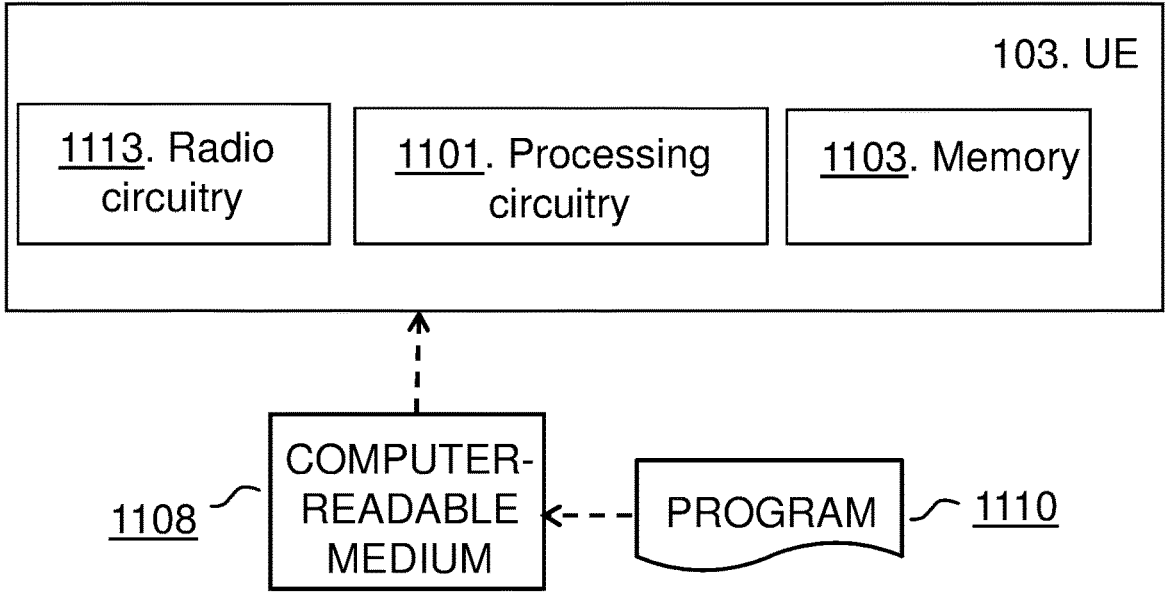

FIG. 11a and FIG. 11b depict two different examples in panels a) and b), respectively, of the arrangement that the UE 103 may comprise. In some embodiments, the UE 103 may comprise the following arrangement depicted in FIG. 11a.

The embodiments herein in the UE 103 may be implemented through one or more processors, such as a processor 1101 in the UE 103 depicted in FIG. 11a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the UE 103. One such carrier may be in the form of a CD ROM disc. It is however feasible with other data carriers such as a memory stick. The computer program code may furthermore be provided as pure program code on a server and downloaded to the UE 103.

The UE 103 may further comprise a memory 1103 comprising one or more memory units. The memory 1103 is arranged to be used to store obtained information, store data, configurations, schedulings, and applications etc. to perform the methods herein when being executed in the UE 103. Thus, the UE 103 may be configured to perform the method according to the first aspect.

In some embodiments, the UE 103 may receive information from, e.g., the network node 101, through a receiving port 1104. In some embodiments, the receiving port 1104 may be, for example, connected to one or more antennas in UE 103. In other embodiments, the UE 103 may receive information from another structure in the communications system through the receiving port 1104. Since the receiving port 1104 may be in communication with the processor 1101, the receiving port 1104 may then send the received information to the processor 1101. The receiving port 1104 may also be configured to receive other information.

The processor 1101 in the UE 103 may be further configured to transmit or send information to e.g. first network node 101 or another structure in the communications system 100, through a sending port 1105, which may be in communication with the processor 1110, and the memory 1103.

The UE 103 may comprise an obtaining unit 1115, an initiating unit 1117, a selecting unit 1120, a transmitting unit 1121, and other units 1140.

The UE 103 in a communications system 100 is adapted to obtain, e.g. by means of the obtaining unit 1115, e.g. by receiving, information indicating a BWP configuration from the network node 101. Thus, the UE 103 is adapted, or configured, to receive, e.g. by means of the obtaining unit 1115, information indicating a BWP configuration from the network node 101. The information may be received directly from the network node 101 or via some other node or memory unit. The BWP configuration comprises at least one initial BWP and at least one non-initial BWP. The UE 103 is further adapted, or configured, to initiate, e.g. by means of the initiating unit 1117, a RA procedure according to the obtained BWP configuration. The UE 103 is adapted, or configured, to transmit, e.g. by means of the initiating unit 1117, a RA preamble message to the network node 101.

In some embodiments, the BWP configuration may comprise a primary initial BWP, at least one secondary initial BWP, and at least one non-initial BWP. In other embodiments, the BWP configuration may comprise a primary initial BWP, a first non-initial BWP, and a second non-initial BWP.

In embodiments when the BWP configuration comprises at least one primary and at least one secondary initial BWP, the at least one secondary initial BWP may be configured via a supplementary carrier; or in a second cell which belongs to a same cell group or a different cell group as the cell where the RA is triggered; or in the same cell as the primary initial BWP.

In some embodiments, the initial BWP, e.g. the primary initial BWP, may comprise a LBT sub band. In some embodiments, at least one of said at least one initial BWP, e.g. the primary initial BWP, may comprise a plurality of LBT sub bands. For example, the primary initial BWP may comprise a first LBT sub band and a second LBT sub band. In these embodiments, when at least one of said at least one initial BWP, e.g. the primary initial BWP, comprises a plurality of LBT sub bands, the UE 103 may be adapted to select, e.g. by means of the selecting unit 3020, one of the plurality of LBT sub bands; and to transmit, e.g. by means of the transmitting unit 3021, the RA preamble to the network node 101 on the selected LBT sub band. The selected sub band, e.g. the first LBT sub band or second LBT sub band, may be the LBT sub band that wins the LBT, e.g. the LBT sub band that fulfills a criterion.

In some embodiments at least one of said at least one non-initial BWP, e.g. the first non-initial BWP and/or the second non-initial BWP, may comprise at least one LBT sub band. In these embodiments, when the non-initial BWP comprises multiple LBT sub bands, ROs may be configured across multiple LBT sub bands, and the ROs belong to a same or different PRACH configuration.

In some embodiments, at least one of the following parameters may be defined in the PRACH configuration, e.g. according to RRC IE RACH-ConfigGeneric, a first parameter indicating a sub band offset, a second parameter indicating the number of PRACH transmission occasions in one time instance in one LBT sub band, and a reused at least one existing third parameter associated with LBT sub band. The first parameter may be referred to as e.g. msg1-FrequencyStart-sub band. The second parameter may be referred to as e.g. msg1-FDM-sub band. The at least one other parameter, e.g. the msg1-FDM-sub band parameter and/or an msg1-FrequencyStart-sub band parameter, may be defined for every sub band or for configured specific sub bands.

In some embodiments, a separate PRACH configuration corresponding to e.g., RRC IE RACH-Config Common may be configured in a LBT sub band. The separate PRACH configuration may be associated with a LBT sub band index.

Those skilled in the art will also appreciate that the obtaining unit 1115, the initiating unit 1117, the selecting unit 1120, the transmitting unit 1121 and other units 1140 described above may refer to a combination of analog and digital circuits, and/or one or more processors configured with software and/or firmware, e.g., stored in memory, that, when executed by the one or more processors such as the processor 1101, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Also, in some embodiments, the different units 1115-1140 described above may be implemented as one or more applications running on one or more processors such as the processor 1101.

Thus, the methods according to the embodiments described herein for the UE 103 may be respectively implemented by means of a computer program 1110 product, comprising instructions, i.e., software code portions, which, when executed on at least one processor 1101, cause the at least one processor 1101 to carry out the actions described herein, as performed by the UE 103. The computer program 1110 product may be stored on a computer-readable storage medium 1108. The computer-readable storage medium 1108, having stored thereon the computer program 1110, may comprise instructions which, when executed on at least one processor 1101, cause the at least one processor 1101 to carry out the actions described herein, as performed by the UE 103. In some embodiments, the computer-readable storage medium 1108 may be a non-transitory computer-readable storage medium, such as a CD ROM disc, or a memory stick. In other embodiments, the computer program 1110 product may be stored on a carrier comprising the computer program 1110 just described, wherein the carrier is one of an electronic signal, optical signal, radio signal, or the computer-readable storage medium 508, as described above.

The UE 103 may comprise a communication interface configured to facilitate communications between the UE 103 and other nodes or devices, e.g., the network node 101 or another structure. The interface may comprise, for example, a transceiver configured to transmit and receive radio signals over an air interface in accordance with a suitable standard.

In other embodiments, the UE 103 may comprise the following arrangement depicted in FIG. 11*b*. The UE 103 may comprise a processing circuitry 1101, e.g., one or more processors such as the processor 1110, in the UE 103 and the memory 1103. The UE 103 may also comprise a radio circuitry 1113, which may comprise e.g., the receiving port 1104 and the sending port 1105. The processing circuitry 1111 may be configured to, or operable to, perform the method actions according to FIG. 5, in a similar manner as that described in relation to FIG. 11*a*. The radio circuitry 1113 may be configured to set up and maintain at least a wireless connection with the UE 103. Circuitry may be understood herein as a hardware component.

Hence, embodiments herein also relate to the UE 103 operative to operate in the communications system. The UE 103 may comprise the processing circuitry 1111 and the memory 1103, said memory 1103 comprising instructions executable by the processing circuitry 1111, whereby the UE 103 is further operative to perform the actions described herein in relation to the UE 103, e.g. in FIGS. 5 and 6.

Figure 12A:
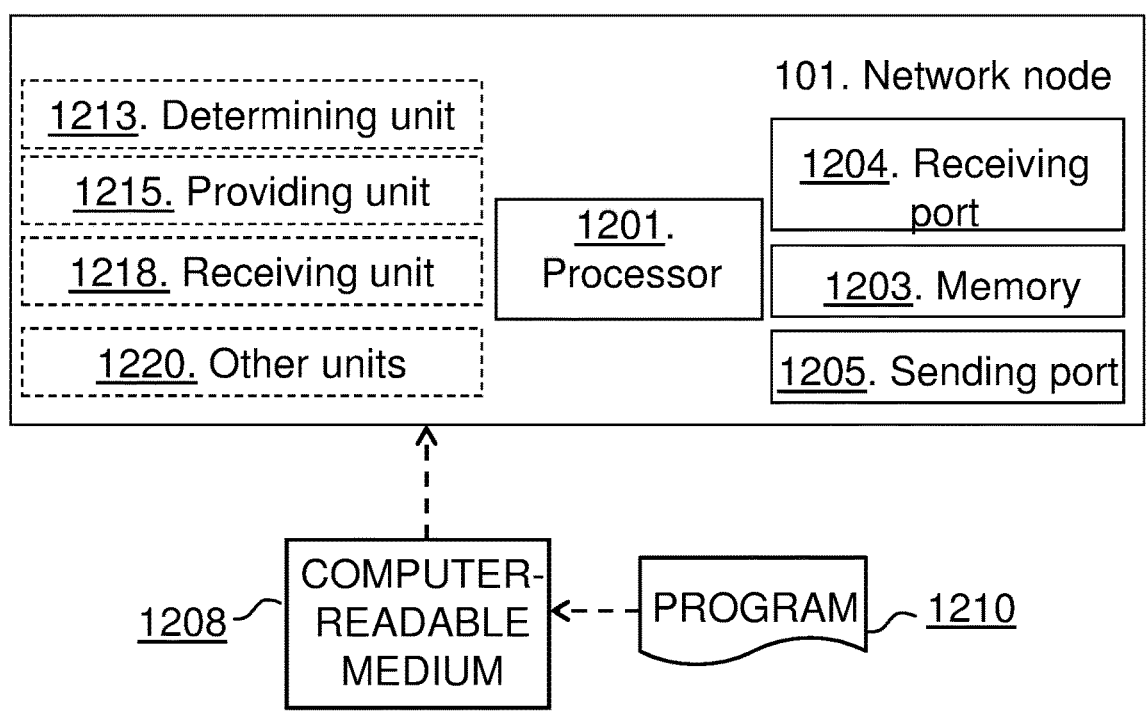
FIG. 12a-12b are schematic drawings illustrating an example of a network node.
Figure 12B:
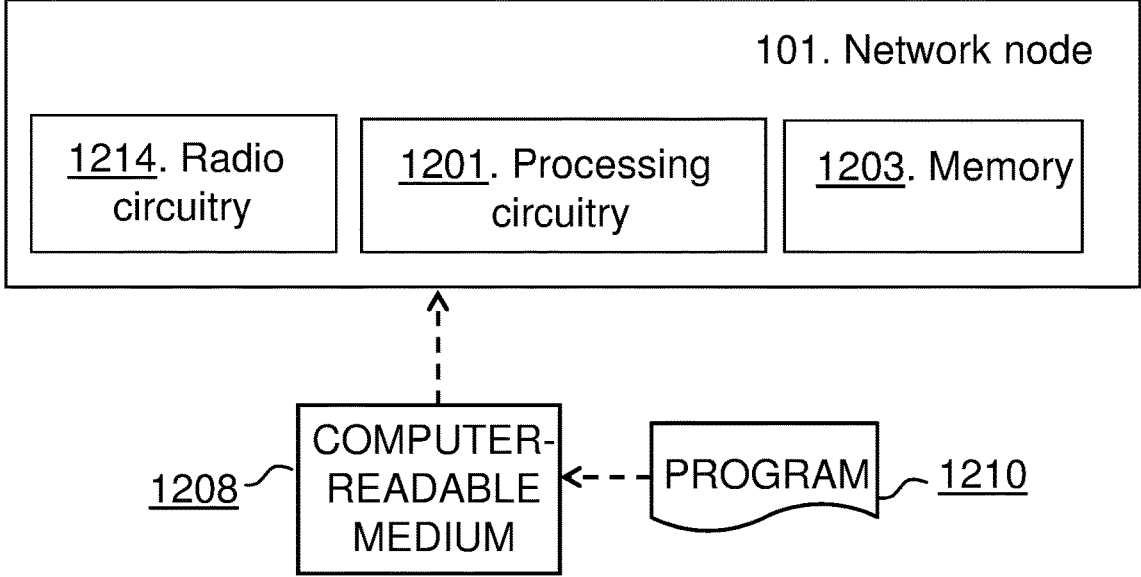

FIGS. 12*a* and FIG. 12*b* depict two different examples in panels a) and b), respectively, of the arrangement that the network node 101 may comprise. In some embodiments, the network node 101 may comprise the following arrangement depicted in FIG. 12*a*.

The embodiments herein in the network node 101 may be implemented through one or more processors, such as a processor 1201 in the network node 101 depicted in FIG. 12*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 101. One such carrier may be in the form of a CD ROM disc. It is however feasible with other data carriers such as a memory stick. The computer program code may furthermore be provided as pure program code on a server and downloaded to the network node 101.

The network node 101 may further comprise a memory 1203 comprising one or more memory units. The memory 1203 is arranged to be used to store obtained information, store data, configurations, schedulings, and applications etc. to perform the methods herein when being executed in the network node 101.

In some embodiments, the network node 101 may receive information from, e.g. the UE 103 and/or another network node, through a receiving port 1204. In some embodiments, the receiving port 1204 may be, for example, connected to one or more antennas in network node 101. In other embodiments, the network node 101 may receive information from another structure in the communications system 100 the receiving port 1204. Since the receiving port 1204 may be in communication with the processor 1201, the receiving port 1204 may then send the received information to the processor 1201. The receiving port 1204 may also be configured to receive other information.

The processor 1201 in the network node 101 may be further configured to transmit or send information to e.g. the UE 103, or another structure in the communications system 100, through a sending port 1205, which may be in communication with the processor 1201 and the memory 1203.

The network node 101 may comprise a determining unit 1213, a providing unit 1215, a receiving unit 1218, other units 1220 etc.

The network node 101 in the communications system 100 is adapted to determine, e.g. by means of the determining unit 1213, a BWP configuration, wherein the BWP configuration comprises at least one initial BWP and at least one non-initial BWP; provide, e.g. by means of the providing unit 1215, e.g. by transmitting, information indicating the determined BWP configuration to the UE 103; and to receive, e.g. by means of the receiving unit 1218, a RA preamble message from the UE 103 according to the determined BWP configuration. The information provided, or transmitted, to the UE 103 may be transmitted directly to the UE 103 or via some other node or memory unit.

In some embodiments, the BWP configuration may comprise: a primary initial BWP, at least one secondary initial BWPs, and at least one non-initial BWP. In other embodiments, the BWP configuration may comprise a primary initial BWP; a first non-initial BWP; and a second non-initial BWP. In embodiments when the BWP configuration comprises at least one primary and at least one secondary initial BWP, the at least one secondary initial BWPs may be configured via a supplementary carrier; or in a second cell which belongs to a same cell group or a different cell group as the cell where the RA is triggered; or in the same cell as the primary initial BWP.

In some embodiments, the initial BWP, e.g. the primary initial BWP, may comprise a LBT sub band.

In some embodiments, the initial BWP, e.g. the primary initial BWP, may comprise a plurality of LBT sub bands, e.g. a first LBT sub band and a second LBT sub band. In these embodiments, the network node 101 may be adapted to receive, e.g. b y means of the receiving unit 1218, the RA preamble on a selected LBT sub band, which has been selected by the UE 103. For example, the selected sub band, e.g. the first LBT sub band or the second LBT sub band, may be the LBT sub band that wins the LBT.

In some embodiments, the non-initial BWP, e.g. the first non-initial BWP and/or the second non-initial BWP, may comprise at least one LBT sub bands. In embodiments when the non-initial BWP comprises a plurality of LBT sub bands, ROs may be configured across multiple LBT sub bands, and the ROs may belong to a same or different PRACH configuration.

In some embodiments, at least one of the following parameters may be defined in the PRACH configuration, e.g. according to RRC IE RACH-ConfigGeneric, a first parameter indicating a sub band offset; a second parameter indicating the number of PRACH transmission occasions in one time instance in one LBT sub band; and a reused at least one existing third parameters associated with LBT sub band. The first parameter may be referred to as e.g. msg1-FrequencyStart-sub band. The second parameter may be referred to as e.g. msg1-FDM-sub band. The at least one parameters, e.g. the msg1-FDM-sub band parameter and/or an msg1-FrequencyStart-sub band parameter, may be defined for every sub band or for configured specific sub bands.

In some embodiments, a separate PRACH configuration corresponding to e.g., RRC IE RACH-Config Common may be configured in a LBT sub band. The separate PRACH configuration may be associated with a LBT sub band index.

The network node 101 may be an NB, eNB, gNB, RNC, access node, RAN node, core network, CN, node, etc., or any other suitable network node.

Those skilled in the art will also appreciate that the determining unit 1213, the providing unit 1215, the receiving unit 1218, the other units 3020 etc. described above may refer to a combination of analog and digital circuits, and/or one or more processors configured with software and/or firmware, e.g., stored in memory, that, when executed by the one or more processors such as the processor 1201, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Also, in some embodiments, the different units 1213-1220 described above may be implemented as one or more applications running on one or more processors such as the processor 1201.

Thus, the methods according to the embodiments described herein for the network node 101 may be respectively implemented by means of a computer program 1210 product, comprising instructions, i.e., software code portions, which, when executed on at least one processor 1201, cause the at least one processor 1201 to carry out the actions described herein, as performed by the network node 101. The computer program 1210 product may be stored on a computer-readable storage medium 1208. The computer-readable storage medium 1208, having stored thereon the computer program 1210, may comprise instructions which, when executed on at least one processor 1201, cause the at least one processor 1201 to carry out the actions described herein, as performed by the network node 101. In some embodiments, the computer-readable storage medium 1210 may be a non-transitory computer-readable storage medium, such as a CD ROM disc, or a memory stick. In other embodiments, the computer program 1210 product may be stored on a carrier comprising the computer program 1210 just described, wherein the carrier is one of an electronic signal, optical signal, radio signal, or the computer-readable storage medium 1208, as described above.

The network node 101 may comprise a communication interface configured to facilitate communications between the network node 101 and other nodes or devices, e.g., the UE 103, or another structure. The interface may, for example, comprise a transceiver configured to transmit and receive radio signals over an air interface in accordance with a suitable standard.

In other embodiments, the network node 101 may comprise the following arrangement depicted in FIG. 12*b*. The network node 101 may comprise a processing circuitry 1211, e.g., one or more processors such as the processor 1201, in the network node 101 and the memory 1203. The network node 101 may also comprise a radio circuitry 1214, which may comprise e.g., the receiving port 1204 and the second sending port 1205. The processing circuitry 1211 may be configured to, or operable to, perform the method actions according to FIGS. 5 and 7 in a similar manner as that described in relation to FIG. 12*a*. The radio circuitry 1214 may be configured to set up and maintain at least a wireless connection with the network node 101. Circuitry may be understood herein as a hardware component.

Hence, embodiments herein also relate to the network node 101 to operate in the communications system. The network node 101 may comprise the processing circuitry 1211 and the memory 1203. The memory 1203 comprises instructions executable by said processing circuitry 1211, whereby the network node 101 is further operative to perform the actions described herein in relation to the network node 101, e.g. FIGS. 5 and 7.

Further Extensions and Variations

Telecommunication network connected via an intermediate network to a host computer in accordance with some embodiments.

Figure 13:
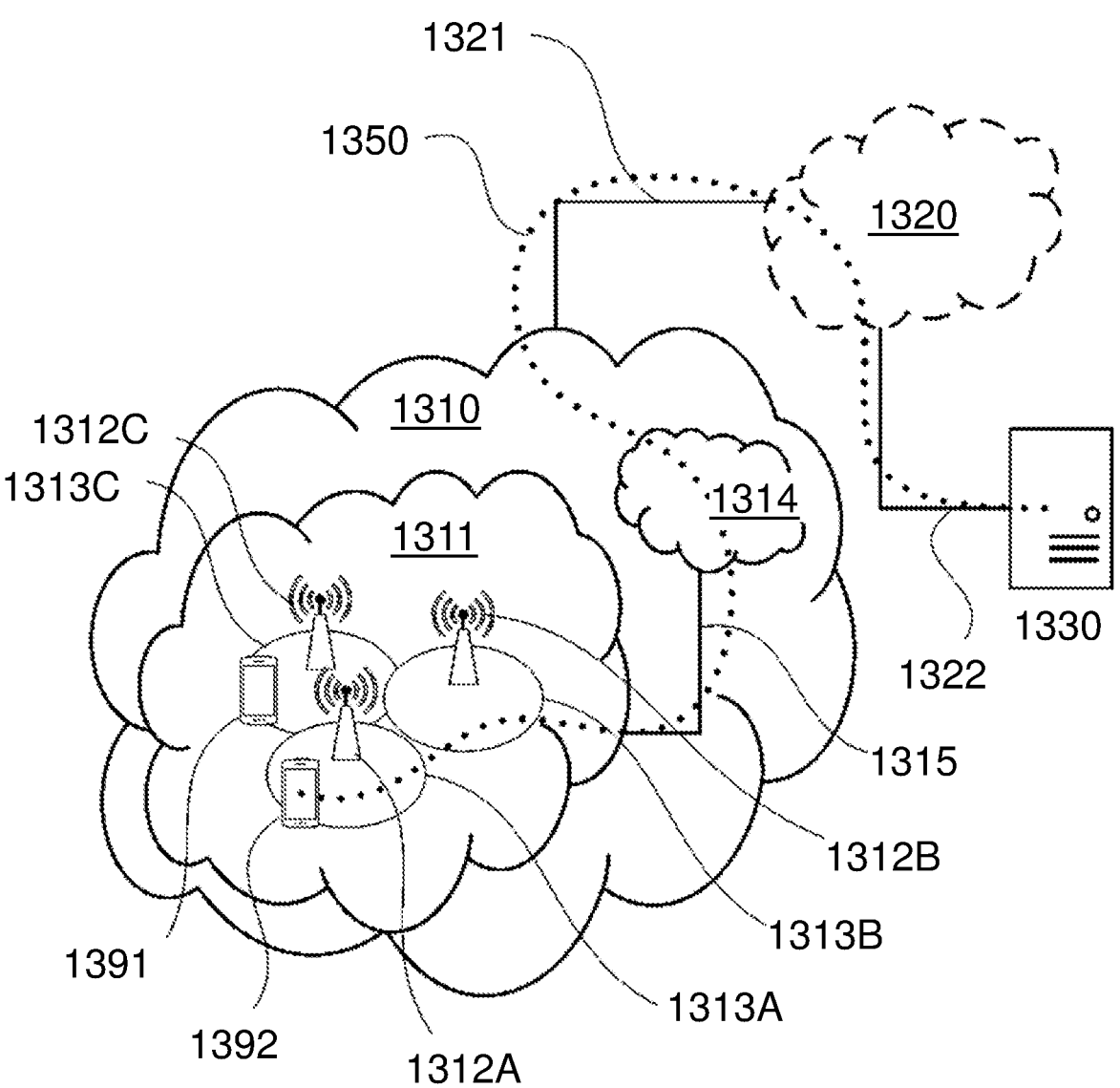
FIG. 13 is a schematic block diagram illustrating a telecommunication network connected via an intermediate network to a host computer.

With reference to FIG. 13, in accordance with an embodiment, a communication system 100 comprises a telecommunication network 1310 such as the communications system 100, for example, a 3GPP-type cellular network, which comprises access network 1311, such as a radio access network, and core network 1314. Access network 1311 comprises a plurality of network nodes 101. For example, base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A plurality of UEs, such as the UE 103 may be comprised in the communications system 100. In FIG. 13, a first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312. Any of the UEs 1391, 1392 may be considered examples of the UE 103.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer

1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an Over-The-Top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

In relation to FIGS. 14-18 which are described next, it may be understood that the base station may be considered an example of the network node 101.

Figure 14:
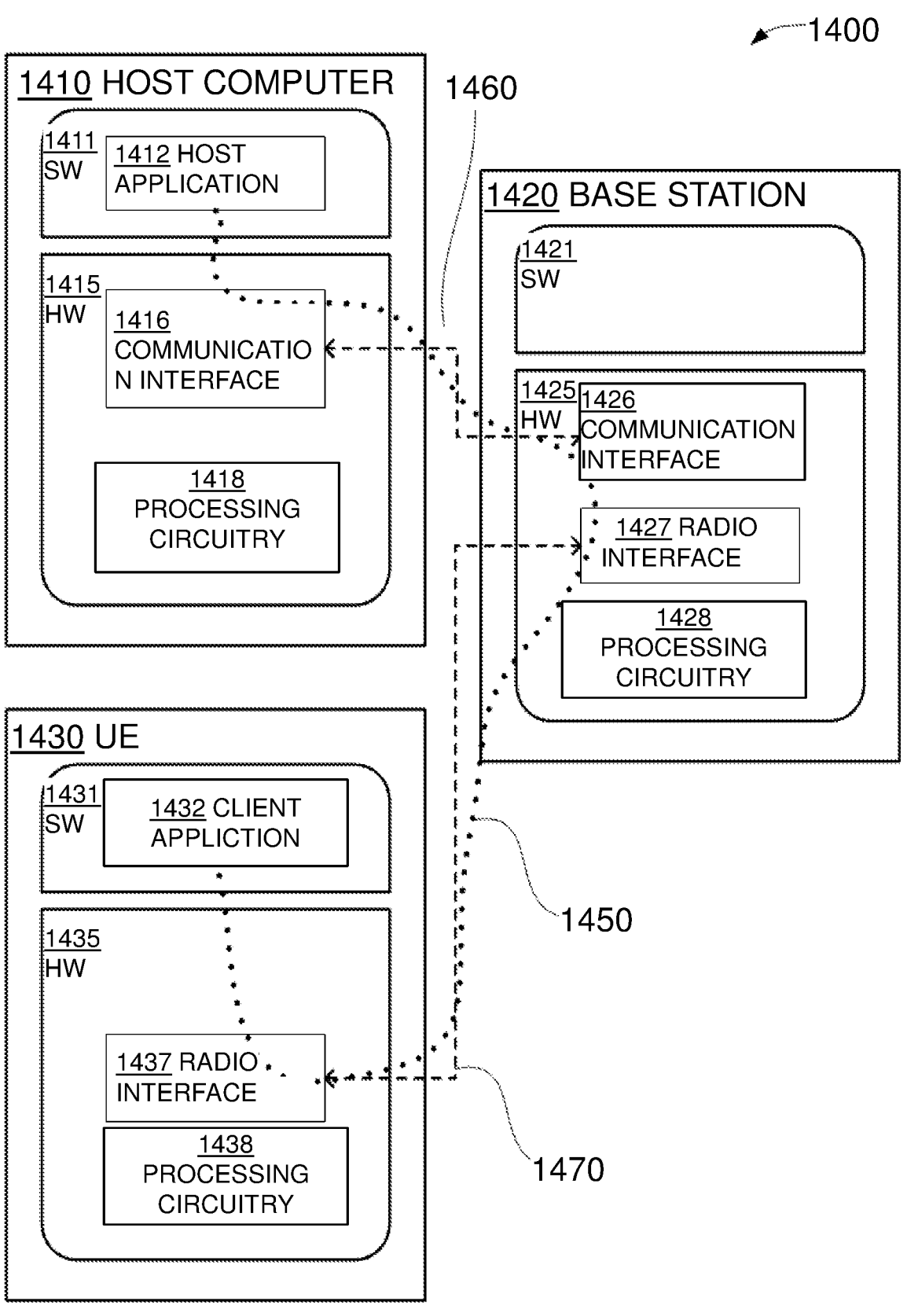
FIG. 14 is a schematic block diagram of a host computer communicating via a base station with a UE over a partially wireless connection.

FIG. 14 illustrates an example of host computer communicating via a base station 101 with a UE 103 over a partially wireless connection in accordance with some embodiments The UE 103 and the network node 101, e.g., a base station and host computer discussed in the preceding paragraphs will now be described with reference to FIG. 14. In communication system 1430, such as the communications system 100, host computer 1410 comprises hardware 1415 comprising communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 comprises a host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further comprises the network node 101 exemplified in FIG. 1414 as a base station 1420 provided in a telecommunication system and comprising hardware 1425 enabling it to communicate with host computer 1410 and with UE 1430. Hardware 1425 may comprise a communication interface 1426 for setting up and maintaining a wired or wireless connection with an interface of a different communication device of communication system 1400, as well as radio interface 1427 for setting up and maintaining at least wireless connection 1470 with the UE 103, exemplified in FIG. 14 as a UE 3330 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further comprises a processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further comprises a UE 1430 already referred to. It's hardware 1435 may comprise a radio interface 1437 configured to set up and maintain wireless connection 1470 with a base station serving a coverage area in which UE 1430 is currently located. Hardware 1435 of UE 1430 further comprises a processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 comprises a client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing, e.g., on the basis of load balancing consideration or reconfiguration of the network.

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may comprise information indicating message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figures 15, 16:
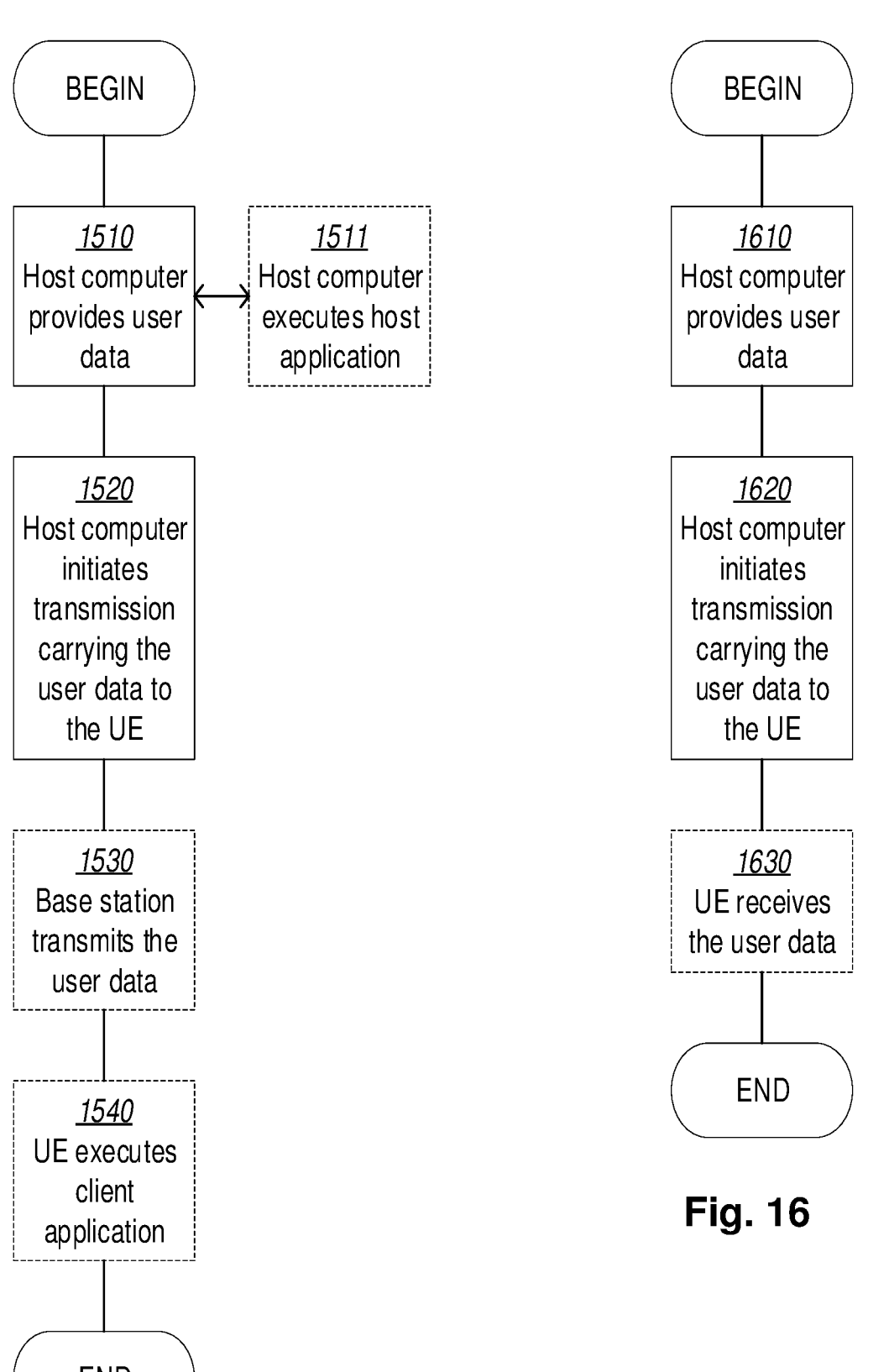
FIG. 15 is a flowchart depicting embodiments of a method in a communications system comprising a host computer, a base station and a UE.
FIG. 16 is a comprising depicting embodiments of a method in a communications system comprising a host computer, a base station and a UE.

FIG. 15 illustrates an example of methods implemented in a communication system comprising a host computer, a base station and a user equipment. FIG. 15 is a flowchart illustrating a method implemented in a communication system. The communication system 100 comprises a host computer, a base station and a UE which may be those described with reference to FIG. 13 and FIG. 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16 illustrates methods implemented in a communication system 100 comprising a host computer, a base station and a user equipment in accordance with some embodiments. FIG. 16 is a flowchart illustrating a method implemented in a communication system. The communication system 100 comprises a host computer, a base station and a UE which may be those described with reference to FIG. 13 and FIG. 14. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figures 17, 18:
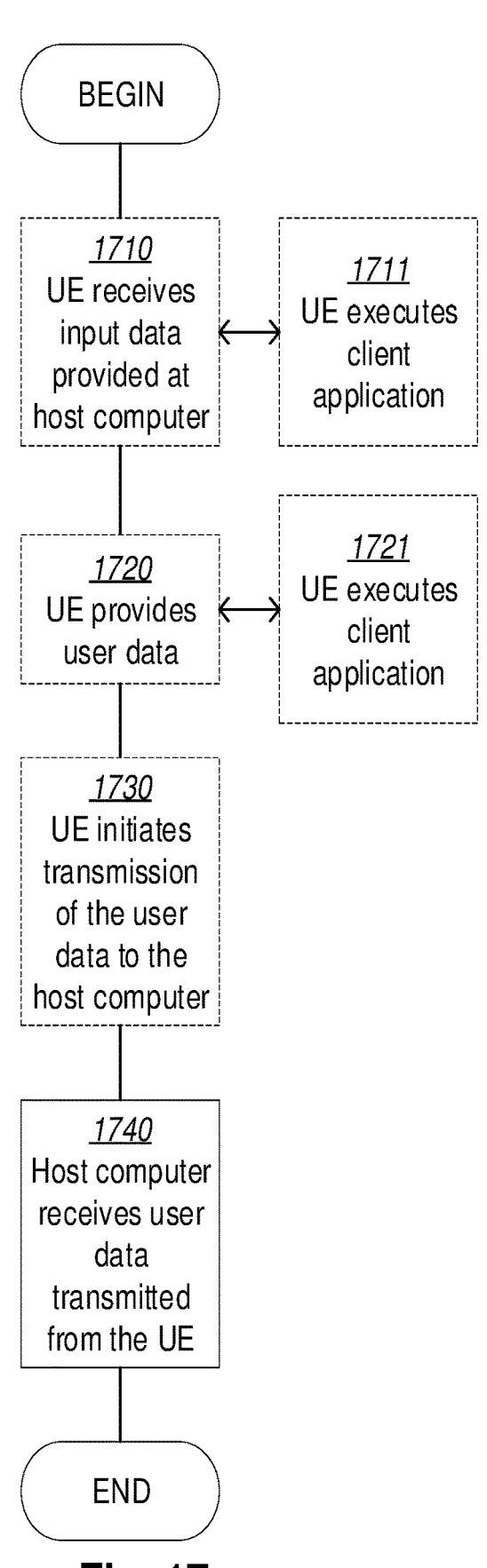
FIG. 17 is a flowchart depicting embodiments of a method in a communications system comprising a host computer, a base station and a UE.
FIG. 18 is a flowchart depicting embodiments of a method in a communications system comprising a host computer, a base station and a UE.

FIG. 17 illustrates methods implemented in a communication system 100 comprising a host computer, a base station and a user equipment. FIG. 17 is a flowchart illustrating a method implemented in a communication system 100. The communication system 100 comprises a host computer, a base station 101 and a UE 103 which may be those described with reference to FIG. 13 and FIG. 14. For simplicity of the present disclosure, only drawing references to FIG. 17 will be included in this section. In step 1710 (which may be optional), the UE 103 receives input data provided by the host computer. Additionally or alternatively, in step 1720, the UE 103 provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18 illustrates methods implemented in a communication system 100 comprising a host computer, a base station and a user equipment. FIG. 18 is a flowchart illustrating a method implemented in a communication system 100. The communication system 100 comprises a host computer, a base station and a UE which may be those described with reference to FIG. 13 and FIG. 14. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Some embodiments may be summarized as follows:

A base station configured to communicate with a UE 103, the base station comprising a radio interface and processing circuitry configured to perform one or more of the actions described herein as performed by the network node 101.

A communication system 100 comprising a host computer comprising:

processing circuitry configured to provide user data; and
a communication interface configured to forward the user data to a cellular network for transmission to a UE 103,
wherein the cellular network comprises a base station 101 having a radio interface and processing circuitry, the base station's processing circuitry configured to perform one or more of the actions described herein as performed by the network node 101.

The communication system 100 may further comprise the base station 101.

The communication system 100 may further comprise the UE 103, wherein the UE 103 is configured to communicate with the base station 101.

The communication system 100, wherein:

the processing circuitry of the host computer is configured to execute a host application, thereby providing the user data; and the UE 103 comprises processing circuitry configured to execute a client application associated with the host application.

A method implemented in a base station 101, comprising one or more of the actions described herein as performed by the network node 101.

A method implemented in a communication system 100 comprising a host computer, a base station and a UE 103, the method comprising:

at the host computer, providing user data; and
at the host computer, initiating a transmission carrying the user data to the UE 103 via a cellular network comprising the base station 101. The base station 101 performs one or more of the actions described herein as performed by the network node 101.

The method may further comprise:

at the base station 101, transmitting the user data.

The user data may be provided at the host computer by executing a host application, and the method may further comprise:

at the UE 103, executing a client application associated with the host application.

A UE 103 configured to communicate with a base station 101, the UE 103 comprising a radio interface and processing circuitry configured to perform one or more of the actions described herein as performed by the UE 103.

A communication system 100 comprising a host computer comprising:

processing circuitry configured to provide user data; and
a communication interface configured to forward user data to a cellular network for transmission to a UE 103,
wherein the UE comprises a radio interface and processing circuitry, the UE's processing circuitry configured to perform one or more of the actions described herein as performed by the UE 103.

The communication system 100 may further comprise the UE 103.

The communication system 100 further comprising a base station 101 configured to communicate with the UE 103.

The communication system 100, wherein:

the processing circuitry of the host computer is configured to execute a host application, thereby providing the user data; and the UE's processing circuitry is configured to execute a client application associated with the host application.

A method implemented in a UE 103, comprising one or more of the actions described herein as performed by the UE 103.

A method implemented in a communication system 100 comprising a host computer, a base station 101 and a UE 103, the method comprising:

at the host computer, providing user data; and
at the host computer, initiating a transmission carrying the user data to the UE 103 via a cellular network comprising the base station, wherein the UE 103 performs one or more of the actions described herein as performed by the UE 103.

The method may further comprise:

at the UE 103, receiving the user data from the base station 101.

A UE 103 configured to communicate with a base station 101, the UE 103 comprising a radio interface and processing circuitry configured to perform one or more of the actions described herein as performed by the UE 103.

A communication system 100 comprising a host computer comprising:

a communication interface configured to receive user data originating from a transmission from a UE 103 to a base station 101, wherein the UE 103 comprises a radio interface and processing circuitry, the UE's processing circuitry configured to perform one or more of the actions described herein as performed by the UE 103.

The communication system 100 may further comprise the UE 103.

The communication system 100 may further comprise the base station 101, wherein the base station 101 comprises a radio interface configured to communicate with the UE 103 and a communication interface configured to forward to the host computer the user data carried by a transmission from the UE 103 to the base station.

The communication system 100, wherein:

the processing circuitry of the host computer is configured to execute a host application; and the UE's processing circuitry is configured to execute a client application associated with the host application, thereby providing the user data.

The communication system 100, wherein:

the processing circuitry of the host computer is configured to execute a host application, thereby providing request data; and the UE's processing circuitry is configured to execute a client application associated with the host application, thereby providing the user data in response to the request data.

A method implemented in a UE 103, comprising one or more of the actions described herein as performed by the UE 103.

The method may further comprise:

providing user data; and forwarding the user data to a host computer via the transmission to the base station 101.

A method implemented in a communication system 100 comprising a host computer, a base station 101 and a UE 103, the method comprising:

at the host computer, receiving user data transmitted to the base station 101 from the UE 103, wherein the UE 103 performs one or more of the actions described herein as performed by the UE 103.

The method may further comprise:

at the UE 103, providing the user data to the base station 101.

The method may further comprise:

at the UE 103, executing a client application, thereby providing the user data to be transmitted; and at the host computer, executing a host application associated with the client application.

The method may further comprise:

at the UE 103, executing a client application; and at the UE 103, receiving input data to the client application, the input data being provided at the host computer by executing a host application associated with the client application, the user data to be transmitted is provided by the client application in response to the input data.

A base station 101 configured to communicate with a UE 103, the base station 101 comprising a radio interface and processing circuitry configured to perform one or more of the actions described herein as performed by the network node 101.

A communication system 100 comprising a host computer comprising a communication interface configured to receive user data originating from a transmission from a UE 103 to a base station, wherein the base station 101 comprises a radio interface and processing circuitry, the base station's processing circuitry configured to perform one or more of the actions described herein as performed by the network node 101.

The communication system 100 may further comprise the base station 101.

The communication system 100 may further comprise the UE 103. The UE 103 is configured to communicate with the base station 101.

The communication system 100 wherein:

the processing circuitry of the host computer is configured to execute a host application;

the UE 103 is configured to execute a client application associated with the host application, thereby providing the user data to be received by the host computer.

A method implemented in a base station 101, comprising one or more of the actions described herein as performed by any of the network node 101.

A method implemented in a communication system 100 comprising a host computer, a base station 101 and a UE 103, the method comprising:

at the host computer, receiving, from the base station 101, user data originating from a transmission which the base station has received from the UE 103, wherein the UE 103 performs one or more of the actions described herein as performed by the UE 103.

The method may further comprise:

at the base station 101, receiving the user data from the UE 103.

The method may further comprise:

at the base station 101, initiating a transmission of the received user data to the host computer.

The embodiments herein relate to methods to configure PRACH across different LBT sub-bands. They relate to channel occupancy time (COT) and random access (RA). The method described as being performed by the UE 103 may also be described as being performed by the Layer 2 module comprised in the UE 103.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the embodiments herein, be performed in another order than the order in which they appear herein.

Some example embodiments according to the present disclosure is presented herein below.

1. A method performed by a User Equipment, UE, (103) in a communications system (100), the method comprises:
   obtaining (502), e.g. by receiving directly or via some other node or memory unit, information indicating a Bandwidth Part, BWP, configuration from the network node (101), wherein the BWP configuration comprises one or multiple initial BWPs and one or multiple non-initial BWPs; and
   initiating (504) a Random Access, RA, procedure according to the obtained BWP configuration, e.g. by transmitting a RA preamble message to the network node (101).

2. The method according to any of the preceding embodiments, wherein the configuration for BWP comprises a primary initial BWP, one or multiple secondary initial BWPs, and a first non-initial BWP.

3. The method according to any of the preceding embodiments, wherein the configuration for BWP comprises a primary initial BWP; a first non-initial BWP; and a second non-initial BWP.

4. The method according to any of the preceding embodiments, wherein the one or multiple secondary initial BWPs is configured via a supplementary carrier, in a second cell which belongs to a same cell group or a different cell group as the cell where the RA is triggered; or in the same cell as the primary initial BWP.

5. The method according to any of the preceding embodiments, wherein the initial BWP, e.g. the primary initial BWP, comprises a LBT sub band.

6. The method according to any of the preceding embodiments, wherein the initial BWP, e.g. the primary initial BWP, comprises a first LBT sub band and a second LBT sub band.

7. The method according to any of the preceding embodiments, when the initial BWP, e.g. the primary initial BWP, comprises a first LBT sub band and a second LBT sub band, then the method comprises:
   selecting (503) the first LBT sub band or the second LBT sub band; and
   transmitting (504) the RA preamble to the network node (101) on the selected first LBT sub band or second LBT sub band.

8. The method according to any of the preceding embodiments, wherein the selected first LBT sub band or second LBT sub band is the LBT sub band that wins the LBT.

9. The method according to any of the preceding embodiments, wherein the non-initial BWP, e.g. the first non-initial BWP and/or the second non-initial BWP, comprises one or multiple LBT sub bands.

10. The method according to any of the preceding embodiments, when the non-initial BWP comprises multiple LBT sub bands, then RACH occasions, ROs, are configured across multiple LBT sub bands, and the ROs belong to a same or different PRACH configuration.

11. The method according to any of the preceding embodiments, wherein at least one of the following parameters is defined in the PRACH configuration, e.g. according to RRC IE RACH-ConfigGeneric:
   a parameter indicating a sub band offset, wherein the parameter may be referred to as e.g. msg1-FrequencyStart-sub band; and/or
   a parameter indicating the number of PRACH transmission occasions in one time instance in one LBT sub band, wherein the parameter may be referred to as e.g. msg1-FDM-sub band; and/or
   a reused one or multiple existing parameters associated with LBT sub band.

12. The method according to any of the preceding embodiments, wherein the one or multiple other parameters, e.g. the msg1-FDM-sub band parameter and/or an msg1-FrequencyStart-sub band parameter, are defined for every sub band or for configured specific sub bands.

13. The method according to any of the preceding embodiments, wherein a separate PRACH configuration corresponding to e.g., RRC IE RACH-Config Common is configured in a LBT sub band, wherein the separate PRACH configuration is associated with a LBT sub band index.

14. The method according to any of the preceding embodiments, wherein the communications system (100) is a 2G network, a 3G network, a 4G network, a 5G network, a 6G network or any other legacy, current of future network.

15. A method performed by a network node (101) in a communications system (100), the method comprising:
   determining (501) a Bandwidth Part, BWP, configuration, wherein the BWP configuration comprises one or multiple initial BWPs and one or multiple non-initial BWPs;
   providing (502), e.g. by transmitting directly or via some other node or memory unit, information indicating the determined BWP configuration to the UE (103), wherein the BWP configuration comprises one or multiple initial BWPs and one or multiple non-initial BWPs; and
   receiving (504) a RA preamble message from the UE (103) according to the provided BWP configuration.

16. The method according to any of the preceding embodiments, wherein the configuration for BWP comprises a primary initial BWP, one or multiple secondary initial BWPs, and a first non-initial BWP.

17. The method according to any of the preceding embodiments, wherein the configuration for BWP comprises a primary initial BWP; a first non-initial BWP; and a second non-initial BWP.

18. The method according to any of the preceding embodiments, wherein the one or multiple secondary initial BWPs is configured via a supplementary carrier, in a second cell which belongs to a same cell group or a different cell group as the cell where the RA is triggered; or in the same cell as the primary initial BWP.

19. The method according to any of the preceding embodiments, wherein the initial BWP, e.g. the primary initial BWP, comprises a LBT sub band.

20. The method according to any of the preceding embodiments, wherein the initial BWP, e.g. the primary initial BWP, comprises a first LBT sub band and a second LBT sub band, 21. The method according to any of the preceding embodiments, when the initial BWP, e.g. the primary initial BWP, comprises a first LBT sub band and a second LBT sub band, then the method comprises:

receiving (504) the RA preamble to the network node (101) on a selected first LBT sub band or second LBT sub band which has been selected by the UE (103).

22. The method according to any of the preceding embodiments, wherein the selected first LBT sub band or second LBT sub band is the LBT sub band that wins the LBT.

23. The method according to any of the preceding embodiments, wherein the non-initial BWP, e.g. the first non-initial BWP and/or the second non-initial BWP, comprises one or multiple LBT sub bands.

24. The method according to any of the preceding embodiments, when the non-initial BWP comprises multiple LBT sub bands, then RACH occasions, ROs, are configured across multiple LBT sub bands, and the ROs belong to a same or different PRACH configuration.

25. The method according to any of the preceding embodiments, wherein at least one of the following parameters is defined in the PRACH configuration, e.g. according to RRC IE RACH-ConfigGeneric:

a parameter indicating a sub band offset, wherein the parameter may be referred to as e.g. msg1-FrequencyStart-sub band; and/or a parameter indicating the number of PRACH transmission occasions in one time instance in one LBT sub band, wherein the parameter may be referred to as e.g. msg1-FDM-sub band; and/or a reused one or multiple existing parameters associated with LBT sub band.

26. The method according to any of the preceding embodiments, wherein the one or multiple other parameters, e.g. the msg1-FDM-sub band parameter and/or an msg1-FrequencyStart-sub band parameter, are defined for every sub band or for configured specific sub bands.

27. The method according to any of the preceding embodiments, wherein a separate PRACH configuration corresponding to e.g., RRC IE RACH-Config Common is configured in a LBT sub band, wherein the separate PRACH configuration is associated with a LBT sub band index.

28. The method according to any of the preceding embodiments, wherein the communications system (100) is a 2G network, a 3G network, a 4G network, a 5G network, a 6G network or any other legacy, current or future network.

29. The method according to any of the preceding embodiments, wherein the network node (101) is an NB, eNB, gNB, RNC, access node, RAN node, core network, CN, node, etc., or any other suitable network node.

30. A User Equipment, UE, (103) in a communications system (100), wherein the UE (103) is adapted to:

obtain, e.g. by receiving directly or via some other node or memory unit, information indicating a Bandwidth Part, BWP, configuration from the network node (101), wherein the BWP configuration comprises one or multiple initial BWPs and one or multiple non-initial BWPs; and to initiate a Random Access, RA, procedure according to the obtained BWP configuration, e.g. by transmitting a RA preamble message to the network node (101).

31. The UE (103) according to any of the preceding embodiments, wherein the configuration for BWP comprises a primary initial BWP, one or multiple secondary initial BWPs, and a first non-initial BWP.

32. The UE (103) according to any of the preceding embodiments, wherein the configuration for BWP comprises a primary initial BWP; a first non-initial BWP; and a second non-initial BWP.

33. The UE (103) according to any of the preceding embodiments, wherein the one or multiple secondary initial BWPs is configured via a supplementary carrier, in a second cell which belongs to a same cell group or a different cell group as the cell where the RA is triggered; or in the same cell as the primary initial BWP.

34. The UE (103) according to any of the preceding embodiments, wherein the initial BWP, e.g. the primary initial BWP, comprises a LBT sub band.

35. The UE (103) according to any of the preceding embodiments, wherein the initial BWP, e.g. the primary initial BWP, comprises a first LBT sub band and a second LBT sub band, 36. The UE (103) according to any of the preceding embodiments, when the initial BWP, e.g. the primary initial BWP, comprises a first LBT sub band and a second LBT sub band, then the UE (103) is adapted to:

selecting (503) the first LBT sub band or the second LBT sub band; and transmitting (504) the RA preamble to the network node (101) on the selected first LBT sub band or second LBT sub band.

37. The UE (103) according to any of the preceding embodiments, wherein the selected first LBT sub band or second LBT sub band is the LBT sub band that wins the LBT.

38. The UE (103) according to any of the preceding embodiments, wherein the non-initial BWP, e.g. the first non-initial BWP and/or the second non-initial BWP, comprises one or multiple LBT sub bands.

39. The UE (103) according to any of the preceding embodiments, when the non-initial BWP comprises multiple LBT sub bands, then RACH occasions, ROs, are configured across multiple LBT sub bands, and the ROs belong to a same or different PRACH configuration.

40. The UE (103) according to any of the preceding embodiments, wherein at least one of the following parameters is defined in the PRACH configuration, e.g. according to RRC IE RACH-ConfigGeneric:

a parameter indicating a sub band offset, wherein the parameter may be referred to as e.g. msg1-FrequencyStart-sub band; and/or a parameter indicating the number of PRACH transmission occasions in one time instance in one LBT sub band, wherein the parameter may be referred to as e.g. msg1-FDM-sub band; and/or a reused one or multiple existing parameters associated with LBT sub band.

41. The UE (103) according to any of the preceding embodiments, wherein the one or multiple other parameters, e.g. the msg1-FDM-sub band parameter and/or an msg1-FrequencyStart-sub band parameter, are defined for every sub band or for configured specific sub bands.

42. The UE (103) according to any of the preceding embodiments, wherein a separate PRACH configuration corresponding to e.g., RRC IE RACH-Config Common is configured in a LBT sub band, wherein the separate PRACH configuration is associated with a LBT sub band index.

43. The UE (103) according to any of the preceding embodiments, wherein the communications system (100) is a 2G network, a 3G network, a 4G network, a 5G network, a 6G network or any other legacy, current of future network.

44. A network node (101) in a communications system (100), the network node (101) adapted to:

determine a Bandwidth Part, BWP, configuration, wherein the BWP configuration comprises one or multiple initial BWPs and one or multiple non-initial BWPs;

provide, e.g. by transmitting directly or via some other node or memory unit, information indicating the determined BWP configuration to the UE (103), wherein the BWP configuration comprises one or multiple initial BWPs and one or multiple non-initial BWPs; and to receive a RA preamble message from the UE (103) according to the provided BWP configuration.

45. The network node (101) according to any of the preceding embodiments, wherein the configuration for BWP comprises a primary initial BWP, one or multiple secondary initial BWPs, and a first non-initial BWP.

46. The network node (101) according to any of the preceding embodiments, wherein the configuration for BWP comprises a primary initial BWP; a first non-initial BWP; and a second non-initial BWP.

47. The network node (101) according to any of the preceding embodiments, wherein the one or multiple secondary initial BWPs is configured via a supplementary carrier, in a second cell which belongs to a same cell group or a different cell group as the cell where the RA is triggered; or in the same cell as the primary initial BWP.

48. The network node (101) according to any of the preceding embodiments, wherein the initial BWP, e.g. the primary initial BWP, comprises a LBT sub band.

49. The network node (101) according to any of the preceding embodiments, wherein the initial BWP, e.g. the primary initial BWP, comprises a first LBT sub band and a second LBT sub band, 50. The network node (101) according to any of the preceding embodiments, when the initial BWP, e.g. the primary initial BWP, comprises a first LBT sub band and a second LBT sub band, then the network node (101) is adapted to:

receive the RA preamble to the network node (101) on a selected first LBT sub band or second LBT sub band which has been selected by the UE (103).

51. The network node (101) according to any of the preceding embodiments, wherein the selected first LBT sub band or second LBT sub band is the LBT sub band that wins the LBT.

52. The network node (101) according to any of the preceding embodiments, wherein the non-initial BWP, e.g. the first non-initial BWP and/or the second non-initial BWP, comprises one or multiple LBT sub bands.

53. The network node (101) according to any of the preceding embodiments, when the non-initial BWP comprises multiple LBT sub bands, then RACH occasions, ROs, are configured across multiple LBT sub bands, and the ROs belong to a same or different PRACH configuration.

54. The network node (101) according to any of the preceding embodiments, wherein at least one of the following parameters is defined in the PRACH configuration, e.g. according to RRC IE RACH-ConfigGeneric:

a parameter indicating a sub band offset, wherein the parameter may be referred to as e.g. msg1-FrequencyStart-sub band; and/or a parameter indicating the number of PRACH transmission occasions in one time instance in one LBT sub band, wherein the parameter may be referred to as e.g. msg1-FDM-sub band; and/or a reused one or multiple existing parameters associated with LBT sub band.

55. The network node (101) according to any of the preceding embodiments, wherein the one or multiple other parameters, e.g. the msg1-FDM-sub band parameter and/or an msg1-FrequencyStart-sub band parameter, are defined for every sub band or for configured specific sub bands.

56. The network node (101) according to any of the preceding embodiments, wherein a separate PRACH configuration corresponding to e.g., RRC IE RACH-Config Common is configured in a LBT sub band, wherein the separate PRACH configuration is associated with a LBT sub band index.

57. The network node (101) according to any of the preceding embodiments, wherein the communications system (100) is a 2G network, a 3G network, a 4G network, a 5G network, a 6G network or any other legacy, current of future network.

58. The network node (101) according to any of the preceding embodiments, wherein the network node (101) is an NB, eNB, gNB, RNC, access node, RAN node, core network, CN, node, etc., or any other suitable network node.

59. A first computer program comprising instructions which, when executed on at least one processor, cause the at least one processor to carry out the method according to any one of embodiments 1-14.

60. A first carrier comprising the first computer program of embodiment 59, wherein the first carrier is one of an electronic signal, optical signal, radio signal or computer readable storage medium.

61. A second computer program comprising instructions which, when executed on at least one processor, cause the at least one processor to carry out the method according to any one of embodiments 15-29.

62. A second carrier comprising the second computer program of embodiment 61, wherein the second carrier is one of an electronic signal, optical signal, radio signal or computer readable storage medium.

The invention claimed is:

1. A method performed by a User Equipment, UE, in a communications system, the method comprising:

receiving information indicating a Bandwidth Part, BWP, configuration from a network node, wherein the BWP configuration comprises multiple initial BWPs and at least one non-initial BWP, wherein a non-initial BWP of the at least one non-initial BWP comprises a plurality of Listen-Before-Talk, LBT, sub bands, with RACH occasions, ROs, configured across a plurality of said plurality of LBT sub bands, and the ROs belong to a same or different PRACH configuration, wherein at least one parameter is defined in the PRACH configuration and comprises a first parameter indicating an offset of a lowest PRACH transmission occasion in frequency domain with respect to a first physical resource block within one LBT sub band and a second parameter indicating a number of PRACH transmission occasions in one time instance in one LBT sub band;

selecting one of the plurality of LBT sub bands; and initiating a Random Access, RA, procedure with the network node according to the received BWP configuration, the initiating of the RA procedure comprising transmitting a RA preamble to the network node on the selected LBT sub band.

2. The method according to claim 1, wherein the multiple initial BWPs comprise a primary initial BWP and at least one secondary initial BWP.

3. The method according to claim 2, wherein the at least one secondary initial BWP is configured: via a supplementary carrier; or in a second cell which belongs to a same or a different cell group as the cell where the RA is triggered; or in the same cell as the primary initial BWP.

4. The method according to claim 1, wherein the non-initial BWP and another non-initial BWP of the at least one non-initial BWP comprise a PRACH resource in an overlapping LBT sub band.

5. The method according to claim 1, wherein the at least one parameter further comprises:

a reused at least one existing third parameter associated with LBT sub band.

6. The method according to claim 5, wherein the at least one parameter is defined for every sub band or for configured specific sub bands.

7. A method performed by a network node in a communications system, the method comprising:

determining a Bandwidth Part, BWP, configuration, wherein the BWP configuration comprises multiple initial BWPs and at least one non-initial BWP, wherein a non-initial BWP of the at least one non-initial BWP comprises a plurality of Listen-Before-Talk, LBT, sub bands, with RACH occasions, ROs, configured across a plurality of said plurality of LBT sub bands, and the ROs belong to a same or different PRACH configuration, wherein at least one parameter is defined in the PRACH configuration and comprises a first parameter indicating an offset of a lowest PRACH transmission occasion in frequency domain with respect to a first physical resource block within one LBT sub band and a second parameter indicating a number of PRACH transmission occasions in one time instance in one LBT sub band;

transmitting information indicating the determined BWP configuration to a User Equipment, UE; and receiving a Random Access, RA, preamble message from the UE according to the determined BWP configuration, including receiving the RA preamble on a selected LBT sub band of the plurality of LBT sub bands, wherein the selected LBT sub band has been selected by the UE.

8. The method according to claim 7, wherein the multiple initial BWPs comprise a primary initial BWP and at least one secondary initial BWP.

9. The method according to claim 8, wherein the at least one secondary initial BWP is configured: via a supplementary carrier; or in a second cell which belongs to a same or a different cell group as the cell where the RA is triggered; or in the same cell as the primary initial BWP.

10. The method according to claim 7, wherein the non-initial BWP and another non-initial BWP of the at least one non-initial BWP comprise a PRACH resource in an overlapping LBT sub band.

11. The method according to claim 7, wherein the at least one parameter further comprising:

a reused at least one existing third parameter associated with LBT sub band.

12. The method according to claim 11, wherein said at least one parameter is defined for every sub band or for configured specific sub bands.

13. The method according to claim 7, wherein a separate PRACH configuration is configured in a LBT sub band, wherein the separate PRACH configuration is associated with a LBT sub band index.

14. A User Equipment, UE, in a communications system, the UE comprising:

processing circuitry; and memory coupled with the processing circuitry, wherein the memory includes instructions that when executed by the processing circuitry causes the UE to perform operations comprising:

receive information indicating a Bandwidth Part, BWP, configuration from a network node, wherein the BWP configuration comprises multiple initial BWPs and at least one non-initial BWP, wherein a non-initial BWP of the at least one non-initial BWP comprises a plurality of Listen-Before-Talk, LBT, sub band, with RACH occasions, ROs, configured across a plurality of said plurality of LBT sub bands, and the ROs belong to a same or different PRACH configuration, wherein at least one parameter is defined in the PRACH configuration and comprises a first parameter indicating an offset of a lowest PRACH transmission occasion in frequency domain with respect to a first physical resource block within one LBT sub band and a second parameter indicating a number of PRACH transmission occasions in one time instance in one LBT sub band; select one of the plurality of LBT sub bands; and initiate a Random Access, RA, procedure with the network node according to the received BWP configuration and to transmit a RA preamble to the network node on the selected LBT sub band.

15. A network node in a communications system, the network node comprising:

processing circuitry; and memory coupled with the processing circuitry, wherein the memory includes instructions that when executed by the processing circuitry causes the network node to perform operations comprising:

determine a Bandwidth Part, BWP, configuration, wherein the BWP configuration comprises multiple initial BWPs and at least one non-initial BWP wherein a non-initial BWP of the at least one non-initial BWP comprises a plurality of Listen-Before-Talk, LBT, sub bands, with RACH occasions, ROs, configured across a plurality of said plurality of LBT sub bands, and the ROs belong to a same or different PRACH configuration, wherein at least one parameter is defined in the PRACH configuration and comprises a first parameter indicating an offset of a lowest PRACH transmission occasion in frequency domain with respect to a first physical resource block within one LBT sub band and a second parameter indicating a number of PRACH transmission occasions in one time instance in one LBT sub band;

transmit information indicating the determined BWP configuration to a User Equipment, UE; and receive a Random Access, RA, preamble message from the UE according to the determined BWP configuration, including to receive the RA preamble on a selected LBT sub band of the plurality of LBT sub bands, wherein the selected LBT sub band has been selected by the UE.

16. The UE according to claim 14, wherein the multiple initial BWPs comprise a primary initial BWP and at least one secondary initial BWP.

17. The UE according to claim 16, wherein the at least one secondary initial BWP is configured: via a supplementary carrier; or in a second cell which belongs to a same or a different cell group as the cell where the RA is triggered; or in the same cell as the primary initial BWP.

18. The network node according to claim 15, wherein the multiple initial BWPs comprise a primary initial BWP and at least one secondary initial BWP.

* * * * *